(12) United States Patent
Fujinaga

(10) Patent No.: US 8,624,920 B2
(45) Date of Patent: Jan. 7, 2014

(54) IMAGE PROCESSING APPARATUS, PRINTING APPARATUS, AND IMAGE PROCESSING METHOD

(75) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 577 days.

(21) Appl. No.: 12/351,118

(22) Filed: Jan. 9, 2009

(65) Prior Publication Data

US 2009/0179915 A1 Jul. 16, 2009

(30) Foreign Application Priority Data

Jan. 11, 2008 (JP) ................................ 2008-004907

(51) Int. Cl.
*G09G 5/00* (2006.01)

(52) U.S. Cl.
USPC ............................. 345/627; 345/440; 345/619

(58) Field of Classification Search
USPC ......................................... 345/627, 440, 619
See application file for complete search history.

(56) References Cited

U.S. PATENT DOCUMENTS

| | | | |
|---|---|---|---|
| 6,925,612 B2 * | 8/2005 | Yamamoto et al. | 715/860 |
| 2002/0101439 A1 * | 8/2002 | Mamona et al. | 345/649 |
| 2003/0022716 A1 * | 1/2003 | Park et al. | 463/36 |
| 2005/0168566 A1 | 8/2005 | Tada | |
| 2007/0155434 A1 * | 7/2007 | Jobs et al. | 455/565 |
| 2009/0002391 A1 * | 1/2009 | Williamson et al. | 345/619 |

FOREIGN PATENT DOCUMENTS

JP 2004-282439 10/2004

OTHER PUBLICATIONS

Greg Harvey; Roxio Easy Media Creator 8 for Dummies; Copyright 2006 by Wiley Publishing, Inc.; pp. 2, 39, 232, 233, 235, 237, 242, 243, 244 234,.*
Siggy Moersch; Labelflash vs Lightscribe Dvd/Cd labeling; Feb. 14, 2006; http://www.tomshardware.com/reviews/labelflash-lightscribe-dvd,1219.html.*

* cited by examiner

*Primary Examiner* — Said Broome
*Assistant Examiner* — Peter Hoang
(74) *Attorney, Agent, or Firm* — Canon USA Inc. IP Division

(57) ABSTRACT

An image processing apparatus that combines a background image and an object includes a display screen configured to display an image, a wheel device configured to be operated by a user, an a display control unit configured to display on the display screen an image in which a circular background image and at least one object are combined. The image processing apparatus also has a movement control unit configured to move the object on the display screen displayed by the display control unit based on a rotation direction and a rotation amount of the wheel device, while maintaining as is a distance between a center of the background image and a center of the object. The image processing apparatus further includes a rotation control unit configured to rotate the object around the center of the object according to movement of the object by the movement control unit.

19 Claims, 18 Drawing Sheets

COMPOSITE EXAMPLE

ROTATIONAL MOVEMENT EXAMPLE

IMAGE PROCESSING APPARATUS, PRINTING APPARATUS, AND IMAGE PROCESSING METHOD

BACKGROUND OF THE INVENTION

1. Field of the Invention

The present invention generally relates to an image processing apparatus that combines an object with a circular image, a printing apparatus, and an image processing method.

2. Description of the Related Art

Conventionally, household printing apparatuses are mainly used in printing images, documents, and the like, on paper. However, with the increasing use of circular storage medium such as a digital versatile disc (DVD) and a compact disc (CD) in homes, printing apparatuses now exist that are provided with a function for mounting such storage medium, and printing a circular image on a surface thereof. Furthermore, a technique exists for combining an object such as text data and a stamp with an image. Using this technique, an object can be combined with an image to be printed on the above-described circular storage medium. When an object is combined with a background image and printed in such a manner, it maybe necessary to adjust a position of the object with respect to the background image.

Nowadays, operations relating to printing which were previously performed by a personal computer (PC) can be performed using only a printing apparatus main body itself, without the PC. Therefore, it may be desirable that the printing apparatus can easily perform operations such as the above positioning. When the positioning is performed, a common method is to move the object to be combined on a display screen using a key. US Patent Application Publication No. 2005168566 discusses a method which determines a combination position of an object with an image by changing and rotating the position of the image with up/down/right/left keys. However, there is a need for a method which can be operated more directly than the method using the keys.

In view of this, one way would be to provide a touch panel in the printing apparatus. Japanese Patent Application Laid-Open No. 2004-282439 discusses a method for moving an object by touching a touch panel which displays a print preview. However, in most printing apparatuses the display screen is small, and thus it may be difficult to finely perform a movement and rotation operation.

Accordingly, considering that the image to be printed is circular, a wheel device such as a jog wheel may be provided to rotate the image. A user could thus more easily and directly position the object on the background image.

However, if the circular image or object is rotated, an orientation of the object on the display screen will change, and thus the object may not be aligned with a direction of the circular image. For example, as illustrated in FIG. 3E, the directions of the circular image and the object may be out of alignment.

A basic orientation of the object may usually be determined according to the user's preference when the user combines the object with the background image. Therefore, when the object is moved, the determined object orientation changes. In addition, when the user adjusts the object orientation and then moves the object, although the user has adjusted the orientation, the object orientation may move out of alignment.

SUMMARY OF THE INVENTION

According to an aspect of the present invention, an image processing apparatus that combines a background image and an object includes a display screen configured to display an image, a wheel device configured to be operated by a user, and a display control unit configured to display on the display screen an image in which a circular background image and at least one object are combined. The image processing apparatus also has a movement control unit configured to move the object on the display screen displayed by the display control unit, based on a rotation direction and a rotation amount of the wheel device, while maintaining as is a distance between a center of the background image and a center of the object. The image processing device further includes a rotation control unit configured to rotate the object around the center of the object according to movement of the object by the movement control unit.

In another aspect of the invention, a printing apparatus is provided that prints on a storage medium an image in which a background image and an object are combined. The printing apparatus includes a display screen configured to display an image, a wheel device configured to be operated by a user, and a display control unit configured to display on the display screen an image in which a circular background image and at least one object are combined. The printing apparatus also includes a movement control unit configured to move the object on the display screen displayed by the display control unit, based on a rotation direction and a rotation amount of the wheel device, while maintaining as is a distance between a center of the background image and a center of the object. The printer apparatus further includes a rotation control unit configured to rotate the object around the center of the object, according to movement of the object by the movement control unit, and a printing unit configured to print on a circular storage medium the image in which the object is combined with the background image at a position moved to by the movement control unit.

In yet another aspect of the invention, a method is provided for processing an image to combine a background image and an object. The method includes displaying on a display screen an image in which a circular background image and at least one object are combined, moving the object on the displayed display screen based on an input instruction, while maintaining as is a distance between a center of the background image and a center of the object, and rotating the object around the center of the object according to movement of the object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

DETAILED DESCRIPTION OF THE EMBODIMENTS

Various exemplary embodiments, features, and aspects of the invention will be described in detail below with reference to the drawings.

Figure 1:
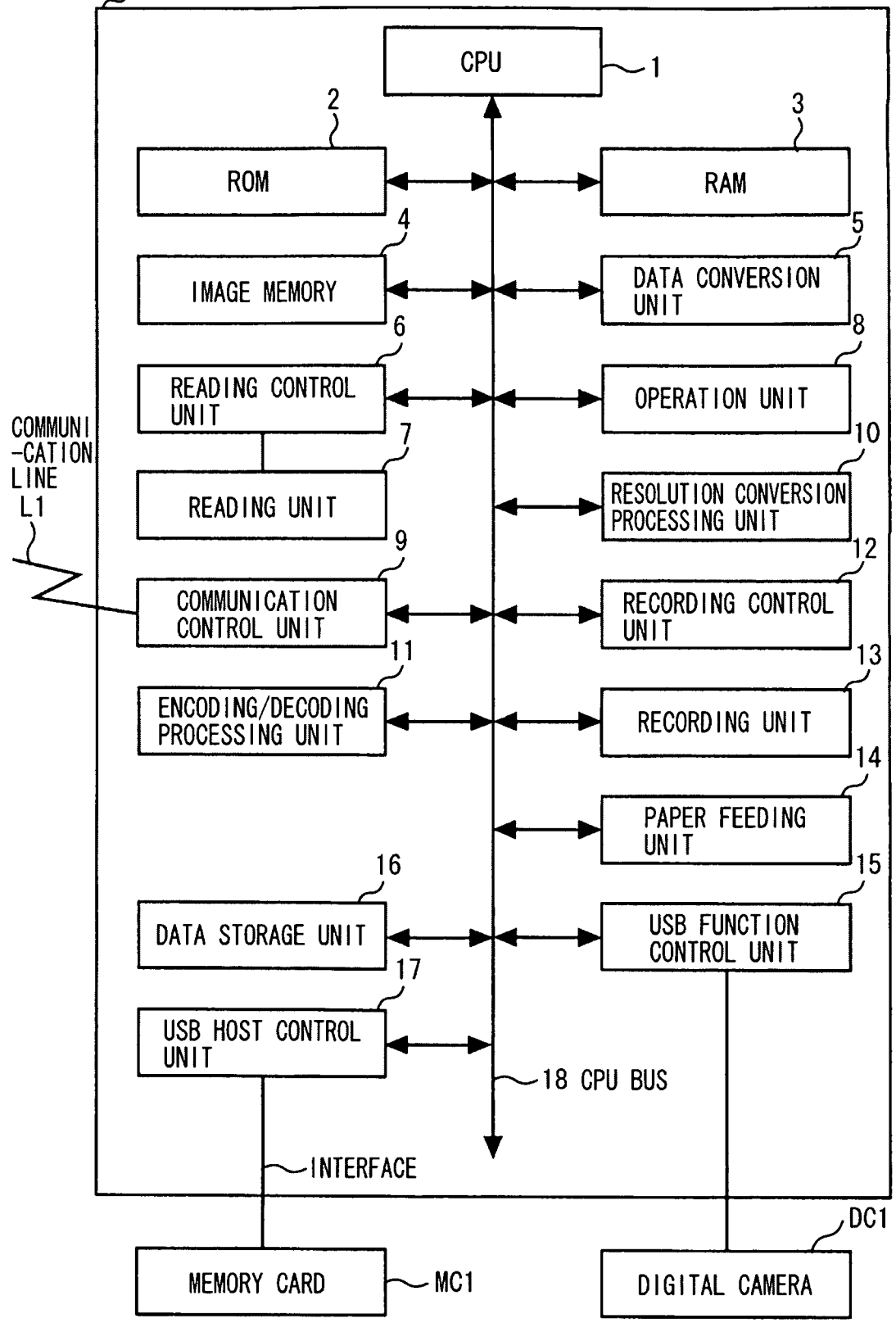
FIG. 1 is a block diagram illustrating an image processing system which includes an image processing apparatus according to an exemplary embodiment of the present invention.

FIG. 1 is a block diagram illustrating an image processing system which includes an image processing apparatus 100 according to an exemplary embodiment of the present invention.

In the embodiment as shown, the image processing apparatus 100 has a central processing unit (CPU) 1, a read only memory (ROM) 2, a random access memory (RAM) 3, an image memory 4, a data conversion unit 5, a reading control unit 6, a reading unit 7, an operation unit 8, a communication control unit 9, a resolution conversion processing unit 10, an encoding/decoding processing unit 11, a recording control unit 12, a recording unit 13, a paper feeding unit 14, a universal serial bus (USB) function control unit 15, a data storage unit 16, a USB host control unit 17, and a CPU bus 18.

The CPU 1 is a system control unit, and may control the entire image processing apparatus 100.

The ROM 2 stores control programs, an embedded operating system (OS) program, etc., which are executed by the CPU 1. In the present exemplary embodiment, each of the control programs stored in the ROM 2 performs software control, such as scheduling and task switching, under management of the embedded OS stored in the ROM 2.

The RAM 3 may be configured by a static RAM (SRAM) and the like. The RAM 3 stores program control variables, and settings and management data of the image processing apparatus 100 registered by an operator, and is provided with buffer regions for various kinds of work. The image memory 4 may be configured by a dynamic RAM (DRAM) and the like, and stores image data. The data conversion unit 5 analyzes the page description language (PDL), etc., and performs conversion of image data, such as rasterization of character data to computer graphics (CG).

The reading unit 7 may be capable of optically reading an original with a contact image sensor (CIS). An image signal that is converted into electric image data is treated by various kinds of image processing, such as binarization processing and halftone processing, via an image processing control unit (not illustrated), and outputs high-accuracy image data. In the present exemplary embodiment, the reading control unit 6 can execute both a sheet reading control method in which the original is read while being conveyed, and a book reading control method in which the original is scanned while on a document positioning plate.

The operation unit 8 allows a user to determine image printing data, and register and define setting data. The operation unit 8 includes various keys, such as a home key, a navigation key, a determination key, and a back key, light-emitting diodes (LEDs) and liquid crystal devices (LCDs) Thus, the operation unit 8 can allow the operator to perform various input operations, and displays an operation state and a status situation of the image processing apparatus 100.

The communication control unit 9 may be configured by, for example, a modulation/demodulation apparatus (MO-DEM), a network control unit (NCU), and the like.

The resolution conversion processing unit 10 performs resolution conversion control of, for example, millimeter-inch resolution conversion of image data, etc. The resolution conversion processing unit 10 may also be capable of executing enlargement/reduction of the image data.

The encoding/decoding processing unit 11 performs the encoding/decoding processing and enlargement/reduction processing of the image data (e.g., modified Huffman (MH), modified Read (MR), modified modified Read (MMR), joint bi-level image experts group (JBIG), joint photographic experts group (JPEG), etc.) handled in the image processing apparatus 100.

The recording control unit 12 performs various kinds of image processing, such as smoothing, recording density compensation, and color compensation, to the image data to be printed, via an image processing control unit (not illustrated), converts the image data into highly-fine image data, and then outputs the converted image data to the recording unit 13. The recording control unit 12 also serves to periodically obtain status information on the recording unit 13 by controlling the recording unit 13.

The recording unit 13 is a printing apparatus formed from, for example, a laser beam printer, inkjet printer, or the like, which prints color image data or monochrome image data on a printing member. Further, in the present exemplary embodiment, the recording unit 13 prints a composite image (e.g., combined image) of a circular image and an object on a circular recording medium.

The paper feeding unit 14 is a unit member which holds the paper for printing. Paper is fed from the paper feeding unit 14 based on a control from the recording control unit 12. In one version, to hold a plurality of kinds of paper in one apparatus, the paper feeding unit 14 may be provided with a plurality of paper feeding unit members. The recording control unit 12 controls which paper feeding unit is to feed the paper.

The USB function control unit 15 performs communication control of the USB interface. The USB function control unit 15 performs protocol control based on the USB communication standards, converts data from a USB control task executed by the CPU 1 into packets, and sends the USB packets to an external information processing terminal. In reverse, the USB function control unit 15 converts USB packets from the external information processing terminal into data, and sends the converted data to the CPU 1.

The data storage unit 16 stores data. Since the DRAM as the image memory 4 may not be provided with a region for data backup, in the present exemplary embodiment, a data storage region is provided as a data storage unit. In some cases the data storage unit 16 maybe shared with the image memory 4. Data backup, etc., can be performed in the data storage unit 16. While the DRAM is used in the present exemplary embodiment, at least one of a hard disk, a volatile memory, and the like, may be used instead of or in addition to the DRAM.

The USB host control unit 17 performs communication by a protocol determined by the USB communication standards. The USB communication standards are standards that allow bidirectional data communication to be performed at high speed in which a plurality of hubs or functions (slaves) can be connected to one host (master).

A memory card MC 1 is a data storage medium that can be connected to the image processing apparatus 100. In the present exemplary embodiment, the memory card MC 1 is connected to the USB host control unit 17 via an interface. The image data and other electronic data in the memory card MC 1 can be accessed via the USB host control unit 17. In the present exemplary embodiment, a background image or the object may be read from the memory card MC 1.

In the present exemplary embodiment, a recording function of the USB communication uses a one-to-one connection form.

The above components 1 to 6 and 8 to 14 are connected to each other via the CPU bus 18 managed by the CPU 1.

In the present exemplary embodiment, the reading unit 7 and the reading control unit 6 read a document original and store document data in the data storage unit 16 via the resolution conversion processing unit 10 and the data conversion unit 5. Further, the document may be searched by an operation from the operation unit 8.

Figure 2:
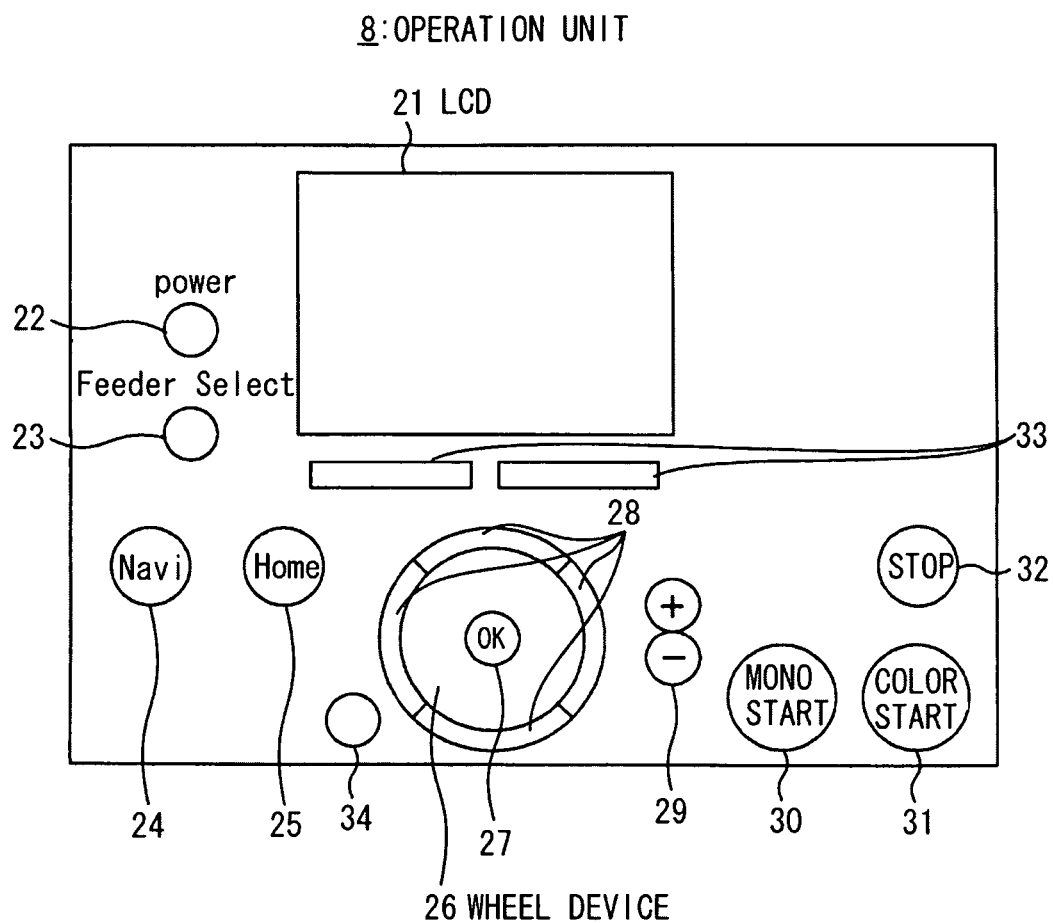
FIG. 2 illustrates a configuration example of an operation unit of the image processing apparatus.

FIG. 2 illustrates a specific example of the operation unit 8 of the image processing apparatus 100.

The operation unit 8 has an LCD 21, a power key 22, a feeder select key 23, a navigation key 24, a home key 25, a wheel device 26, an OK key 27, up/down/right/left keys 28, plus/minus keys 29, a monochrome start key 30, a color start key 31, a stop key 32, a function key 33, and a back key 34.

In the embodiment as shown in FIG. 2, the LCD 21 is a display which displays various pieces of information, such as for example at least one of a message and an operation prompt. In the present exemplary embodiment, the LCD 21 displays an image of printing contents as a preview. The image is called up from the data storage unit 16, controlled by the CPU 1, and displayed. Further, all image displays performed in the present exemplary embodiment, such as object selection and object movement by the user, are performed on the LCD 21. As a display method, coordinate positions (X, Y) are respectively given as horizontal and vertical coordinates, so that (X, Y) values are given to the image which the user wants to display. Then, the CPU 1 performs control functions to display the image on the LCD 21.

The power key 22 is a key for turning ON/OFF power of the apparatus. The paper select key 23 is used for selecting the paper feeding member to be used when the paper feeding unit 14 has a plurality of paper feeding members.

The navigation key 24 is a key for entering a navigation mode which allows the user to easily operate the apparatus.

The home key 25 is a key for going to a home screen which allows the user to enter a job such as copying, scanning, card printing, DVD/CD printing, and setting.

The wheel device 26 is a dial-type operation unit which can be used to, for example, select an image for printing, or change a number of print copies, by turning the wheel device in a clockwise or anticlockwise direction.

Further, the wheel device 26 is used for rotationally moving an object. More specifically, the object can be rotationally moved by the wheel device 26 while maintaining a direction of a circular image and a direction of an object to be combined with the circular image, maintaining a radius which is a distance between a center of a preview image of the circular image, namely the background image, and a center of the object which are displayed on the LCD 21.

The OK key 27 is a key for determining selected items and processing.

The up/down/right/left keys 28 change an item which can be changed upwardly and downwardly or right and left, such as a focus position or a numerical value. The focus position indicates that at least one object is selected among a plurality of objects to be combined with the circular image. Further, the up/down/right/left keys 28 are also used to adjust the radius between the circular image and the object.

The plus/minus keys 29 are used when the user performs a selection from among a plurality of choices, such as a menu and user registration. Further, the plus/minus keys 29 are used for increasing and decreasing a value, and for enlarging and reducing a size. In the present exemplary embodiment, the plus/minus keys 29 are also used for enlarging/reducing a size of the object. The terms "minus" and "plus" respectively refer to "descending order" and "ascending order".

The monochrome start key 30 is a key for starting monochrome facsimile transmission, monochrome copying, etc.

The color key 31 is a key for starting printing of color contents, such as color facsimile transmission, color copying, and printing from a picture card. The color printing of the circular image can be started by the color start key 31.

The stop key 32 is a key for stopping facsimile transmission, copying and other operations.

The function keys 33 are keys corresponding to the screen. A display corresponding to the function key 33 is formed at a lower portion of the LCD 21, and based on the display the user pushes the function key 33. Since the functions change depending on the screen, the function key 33 can be used for multiple functions.

The back key 34 is used for going back to a previous state in the middle of an operation flow etc. By pressing down the back key 34, the process can go back one action.

The operation unit 8 has the above keys and device, so that the user can operate the apparatus. In the present exemplary embodiment, while the above-described devices are used in the present exemplary embodiment, as long as the devices can realize the effects of the present invention, the operation unit is not intended to be limited to above-described configuration.

FIGS. 3A to 3E are a series of diagrams illustrating operations of the present exemplary embodiment and of an example during preview of DVD/CD printing.

In the present exemplary embodiment, the preview for printing the circular image on a DVD/CD can be displayed on the LCD 21. When the object, such as a stamp image or text data, is combined with the circular image in the preview, the object is rotationally moved along, e.g., in synchronization with, the rotational movement of the wheel device 26. According to the present exemplary embodiment, the object can be rotationally moved around the center of the preview display while the top and bottom of the object to be combined with the circular image are maintained as they are.

Figure 3A:
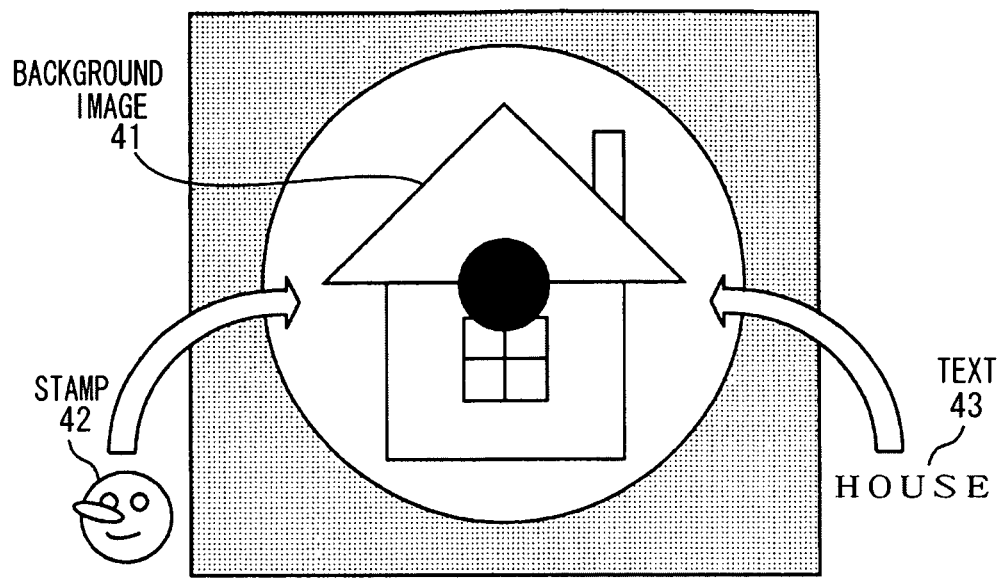
FIG. 3A illustrates an example of combining a stamp and text data with a background image.

FIG. 3A illustrates an example of an object such as a stamp or text data, which is combined with a circular image to be printed on a DVD/CD.

In the present exemplary embodiment, the circular image will be referred to as the "background image" with respect to the object such as the stamp and the text data.

In FIG. 3A, a background image 41 is circularly cropped, and displayed on the LCD 21 as the printing image. A stamp 42 is an image which is to be combined with the background image 41. Text 43 is text data which is to be combined with the background image 41.

During the preview of the DVD/CD printing, a combination operation is performed by pasting and positioning the stamp 42 and text 43 to be combined with the background image 41.

Figure 3B:
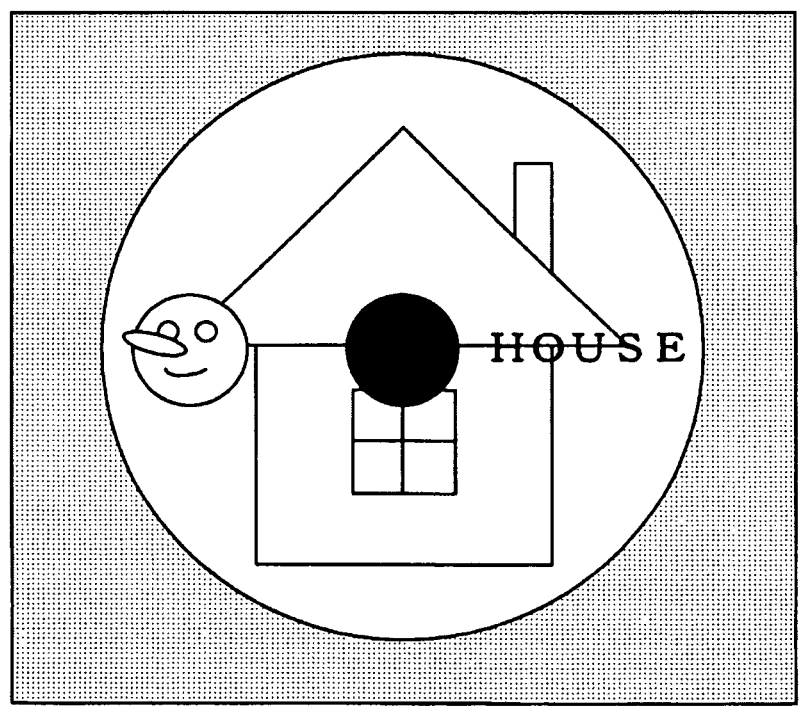
FIG. 3B illustrates an example of a combined image in which the stamp and text data are combined with the background image.

FIG. 3B illustrates an example in which the stamp 42 and the text 43 are combined with the background image 41.

Figure 3C:
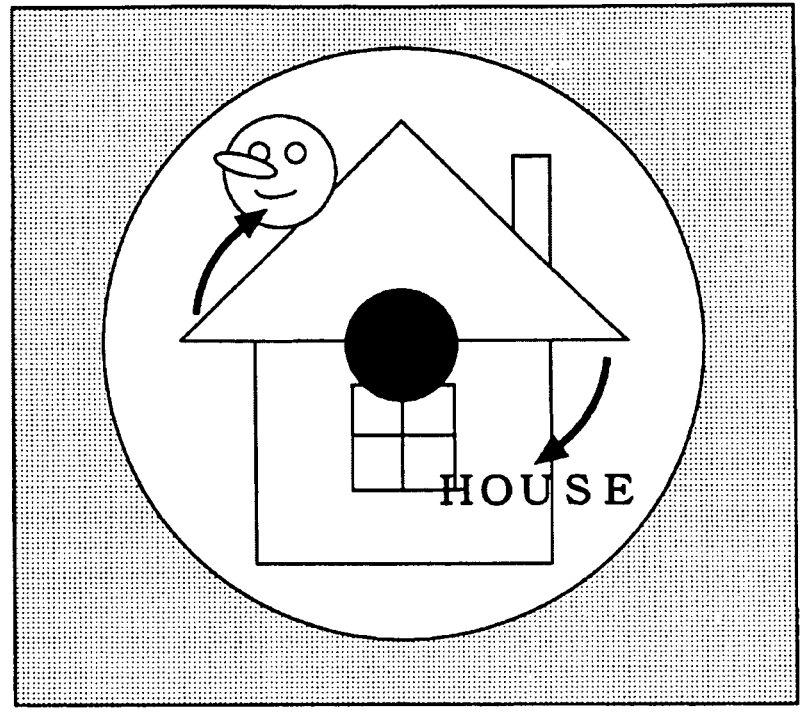
FIG. 3C illustrates an example of rotational movement of the stamp and the text data in the exemplary embodiment of the present invention.

FIG. 3C illustrates an example in which the stamp 42 and the text data 43 are rotationally moved around a center of a preview display region displayed on the LCD 21 as a center point.

When the wheel device 26 is rotated, the stamp 42 and the text 43 are rotationally moved as illustrated in FIG. 3C from the positions illustrated in FIG. 3B. In this case, the wheel device 26 is rotated in the clockwise direction. The stamp 42 and text 43 move in a circle around a center point of the preview display region displayed on the LCD 21. The background image 41 is also displayed in the preview display. Further, at this stage, each of the images of the stamp 42 and text data 43 is rotationally moved (moved along the circle) without being rotated on its own center.

Thus, according to the present exemplary embodiment, by just rotating the wheel device 26, the combined stamp 42 and text 43 can be rotationally moved around the center of the preview, while maintaining the directions of the stamp 42 and the text 43 and the direction of the background image 41. Further, by selecting a plurality of movement targets (e.g., the stamp 42, the text 43, etc.), these targets can be simultaneously moved by the wheel device 26. Details of the operation will be described in descriptions of flowcharts illustrated in FIGS. 8 to 11.

Figure 3D:
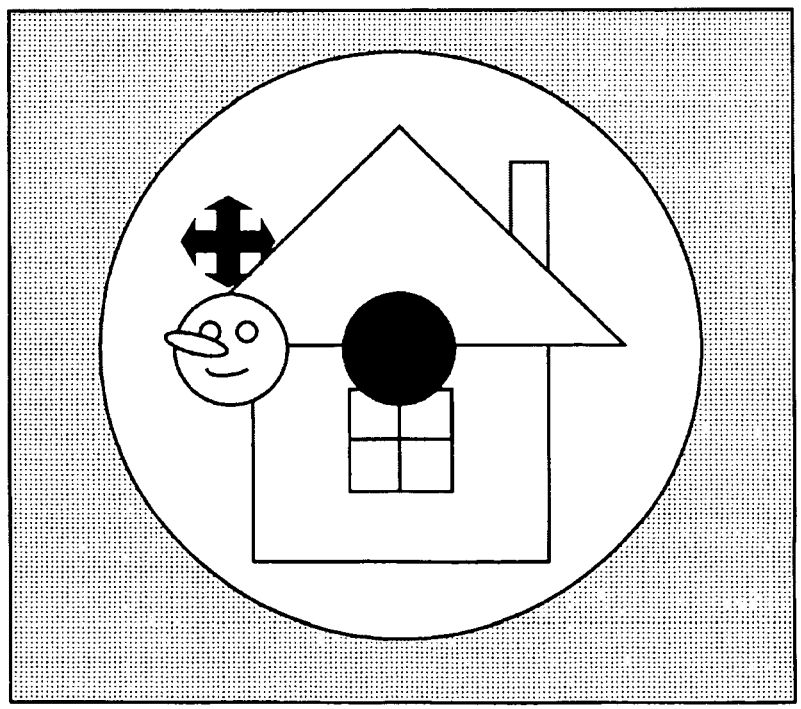
FIG. 3D illustrates an example of a combined image that is moved with up/down/right/left keys.

FIG. 3D illustrates an outline of an example of a combined image which is moved by the up/down/right/left keys 28.

In the example, as illustrated in FIG. 3D, when the stamp 42 is moved on the background image 41 to a destination, the stamp 42 may be further moved to a target destination by using the up/down/right/left keys 28 or the like, so that the operation may be complex. Further, the stamp 42 may be moved without maintaining the distance from the center of the DVD/CD. In other words, a movement method of the example may be suitable for an operation for slightly shifting the object up/down/right/left, but an operation such as positioning the stamp 42 along the circle or the like may be very complex. For example, a two-step operation may be required where the stamp 42 is first moved in an upwards direction by operating the up key, and then moved in a right direction using the right key. More specifically, it can be understood that the movement illustrated in FIG. 3C provides a direct operation for rotationally moving the object.

Figure 3E:
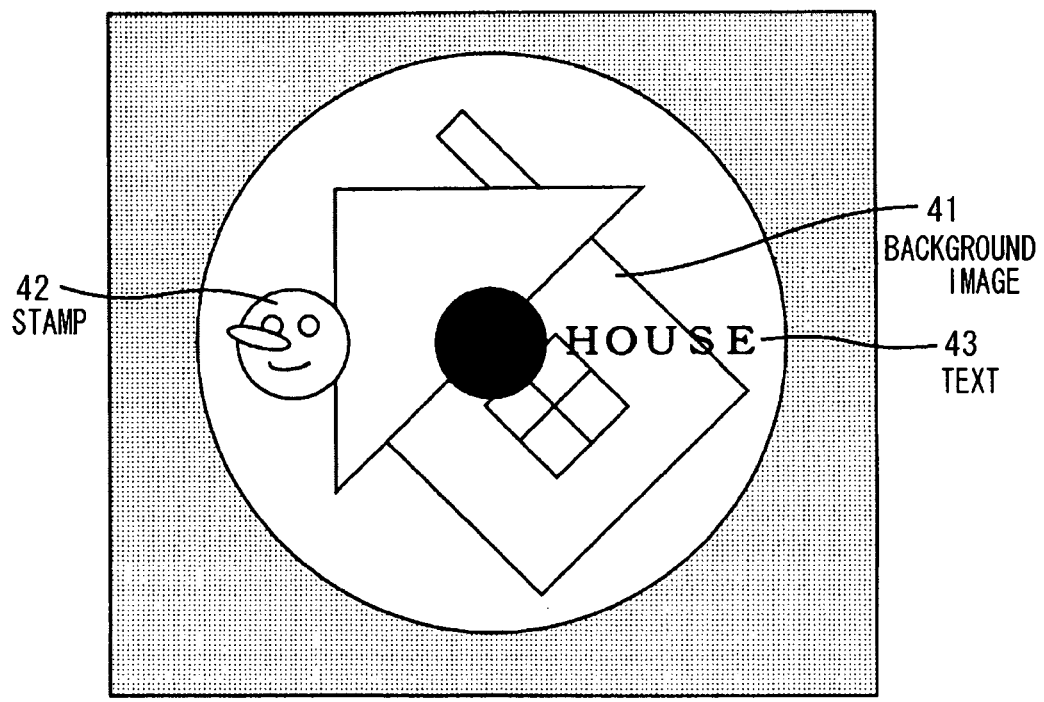
FIG. 3E illustrates the background image that is rotated in the example of FIG. 3D.

FIG. 3E illustrates another example.

In FIG. 3E, the position of the stamp 42 can be changed by rotating the background image 41 with the wheel device 26. However, in this case, the directions of the background image 41 and the stamp 42 become different.

Since the direction of the background image 41 does not match the directions of the stamp 42 and the text 43, a technique such as in FIG. 3D and 3E cannot be used for combining the images while maintaining the direction of the background image 41 and the directions of the stamp 42 and the text 43. More specifically, it can be understood that the present exemplary embodiment illustrated in FIG. 3C would be effective for changing the position of the objects.

However, when the user actually performs the combination operation of a photograph and a stamp, in some cases the photograph itself, which was taken by the user, is slanted. In such a case, the background image slant may have to be corrected. The method illustrated in FIG. 3E may be effective for correcting the background image slant. Namely, to match the directions of the stamp and the background image, the user may adjust the direction of the background image according to the method illustrated in FIG. 3E, and then the stamp can be directly moved by the method for moving the stamp as described above, for example in FIG. 3C.

In the following description, the object, such as the stamp and text data, is the image which is combined with the background image. However, objects other than the stamp and text data may also be treated as the "object", as long as it is an image to be combined. Then, the combined image of the background image and the object can be printed by the recording unit 13 on a circular storage medium, etc.

Figure 4A:
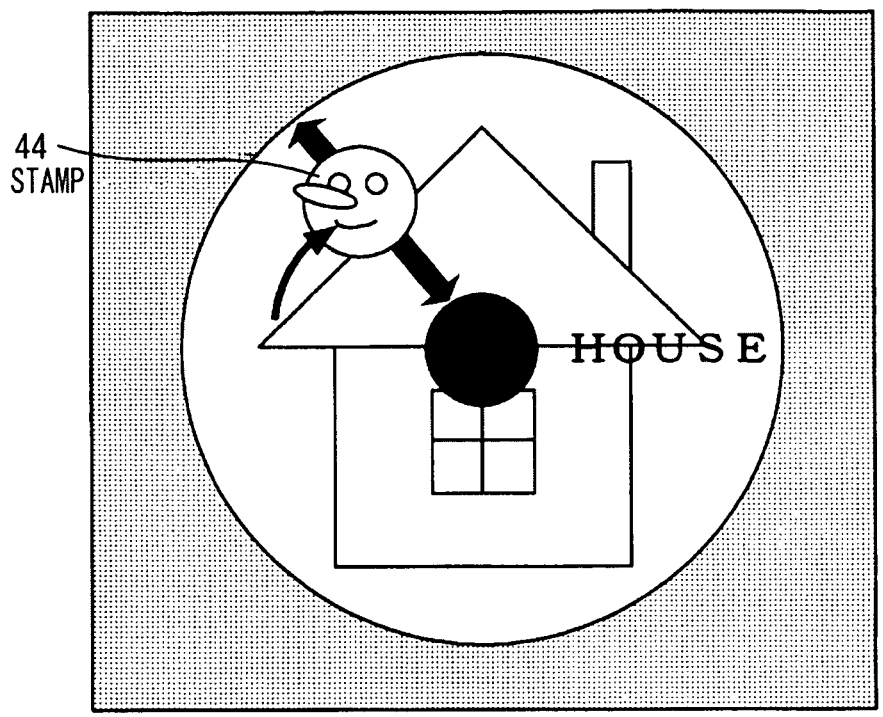
FIG. 4A illustrates an example of adjusting radius length during a preview of DVD/CD printing.

FIG. 4A illustrates an example of adjusting a radius length during the preview of DVD/CD printing.

In the present exemplary embodiment, the radius length is adjusted by the up/down/right/left keys 28. In this embodiment, while the up/down/right/left keys 28 are used as executing units for adjustment, a method other than up/down/right/left keys may also be used to adjust the radius length, for example so long as a method can adjust the length. Processing of adjusting the radius length will be described in more detail using a flowchart illustrated in FIG. 12.

In one version, referring to FIG. 4A, when moving a stamp 44, radius adjustment is performed via the up/down/right/left keys 28. The stamp 44 can be radially moved as illustrated by an arrow of a radial direction by operating the up/down/right/left keys 28. Further, after adjusting the radius by the up/down/right/left keys 28, the stamp 44 can be moved in a circle based on the adjusted radius length by operating the wheel device 26.

The stamp may be moved by controlling coordinate positions of the stamp that has a radius set as the distance from the center of the preview display region to the stamp, so as to move in a horizontal direction and in a perpendicular direction according to a rotation amount of the wheel device 26 detected by the CPU 1.

Figure 4B:
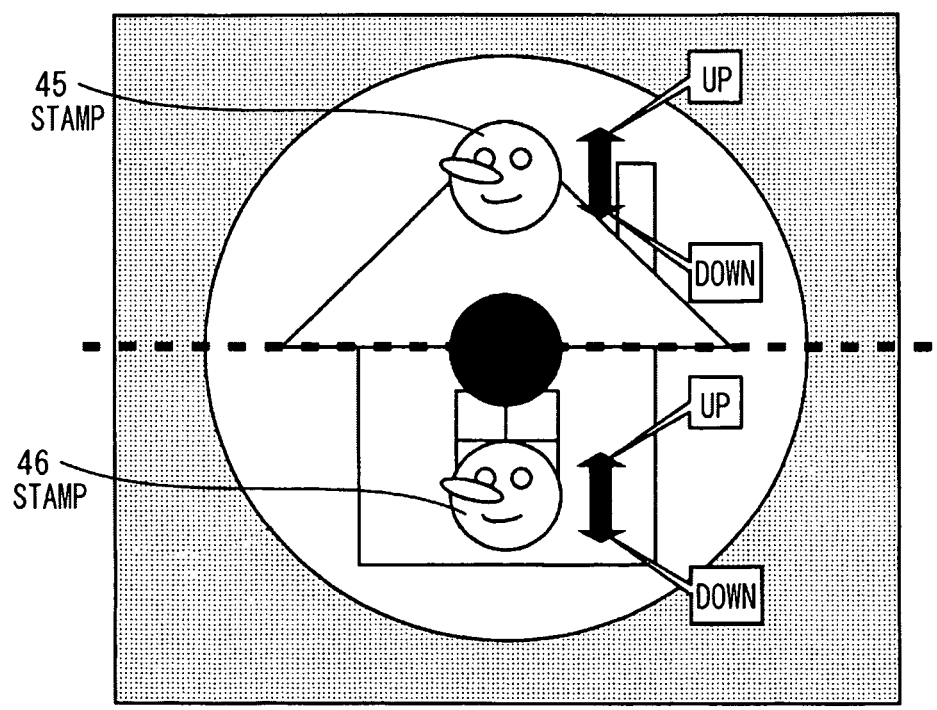
FIG. 4B illustrates an example of adjusting the radius length with the up/down/right/left keys.

FIG. 4B illustrates an example of adjusting the radius length via the up/down/right/left keys 28.

In this example, when a stamp 45 is present in a top half, the up key lengthens the radius, and the down key shortens the radius. On the other hand, like a stamp 46, when the stamp is present in a bottom half, the up key shortens the radius, and the down key lengthens the radius. Namely, the radius can be directly adjusted via the up/down/right/left keys 28.

Figure 4C:
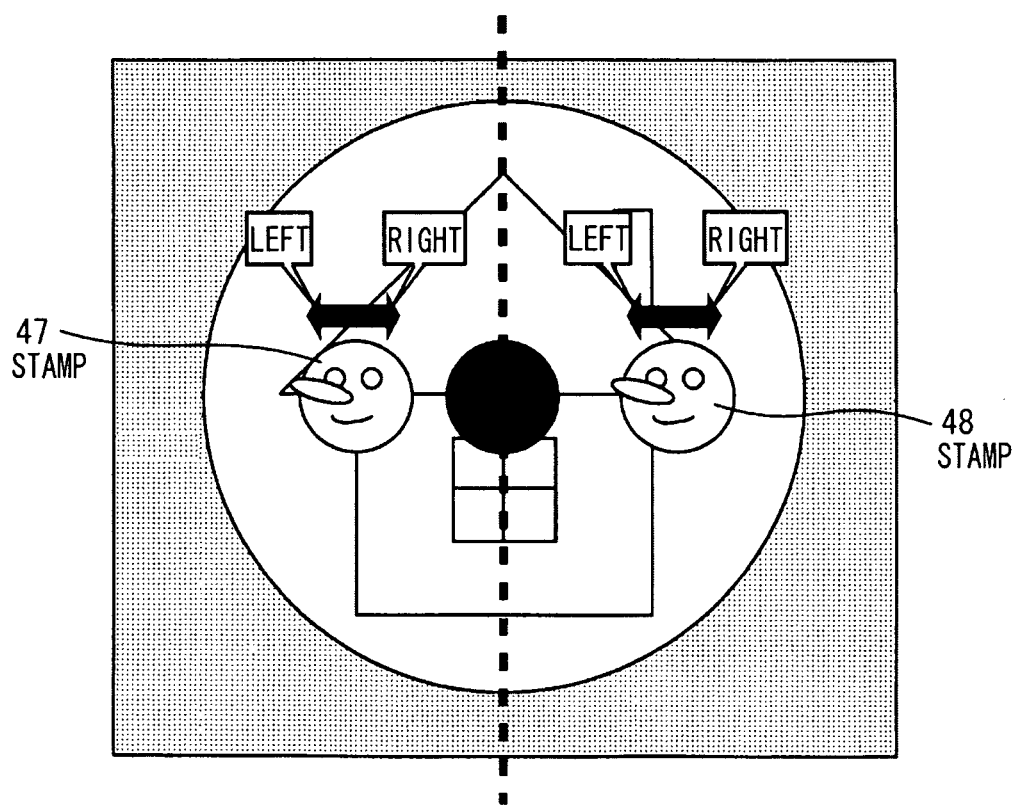
FIG. 4C illustrates an example of adjusting the radius length with the up/down/right/left keys.

FIG. 4C illustrates an example of adjusting the radius length via the up/down/right/left keys 28.

In this example, when a stamp 47 is present in a left half, the left key lengthens the radius, and the right key shortens the radius. On the other hand, like a stamp 48, when the stamp is present in a right half, the left key shortens the radius, and the right key lengthens the radius. Namely, the radius can be directly adjusted via the up/down/right/left keys 28.

In the above actions, up/down/right/left is not applied as is to the lengthening/shortening of the radius length based on the position of the stamp, but the radius length is lengthened or shortened in conjunction with the movement direction of the stamp. Thus, the up/down/right/left keys 28 and the radius length can be adjusted in a more direct manner.

Figure 5A:
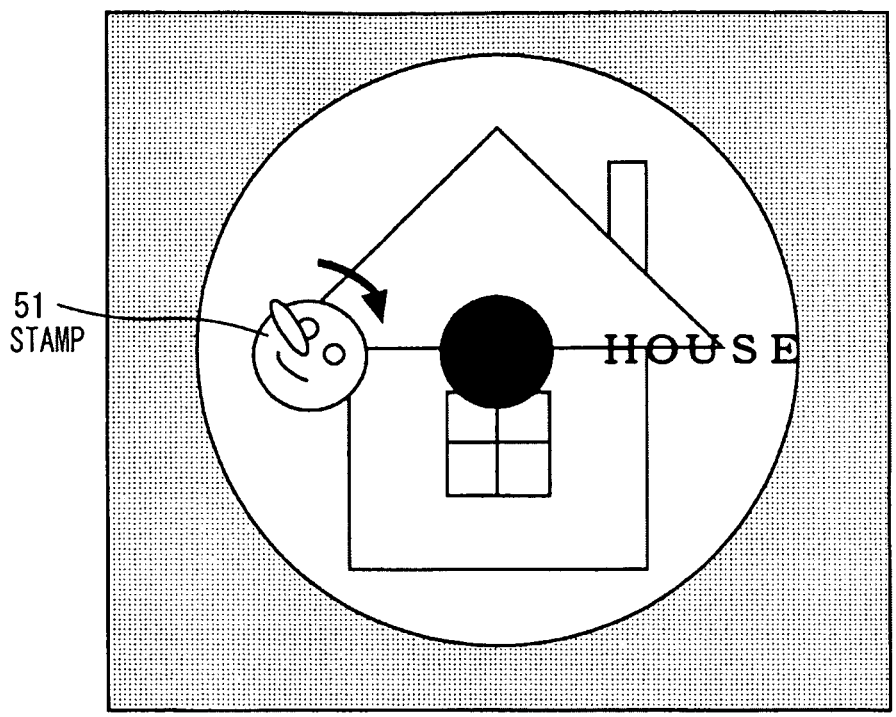
FIG. 5A illustrates a case where only a stamp is rotated, and selected as a rotation candidate.
Figure 5B:
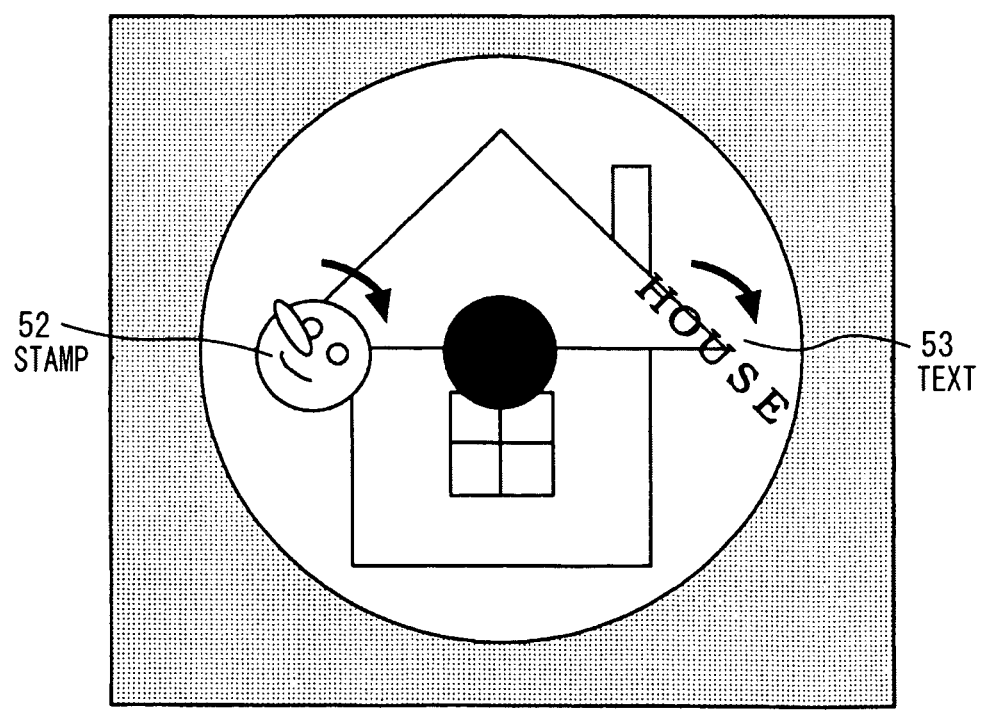
FIG. 5B illustrates an example of rotation in a case where a stamp and text data are selected as rotation candidates.

FIGS. 5A and 5B are explanatory diagrams of the object to be combined in the background image, which is rotated at the position where the object is positioned by operating the wheel device 26 during the preview of DVD/CD printing.

FIG. 5A illustrates an example of a case where only a stamp 51 is selected as target object of rotation, and is rotated.

FIG. 5B illustrates an example of a case where a plurality of rotation target objects, such as a stamp 52 and text 53, are selected, and are rotated.

The objects, namely the stamp 51, stamp 52, and text 53, are each rotated at their arranged positions around their own individual center or around their center of gravity, by rotating the wheel device 26.

The selected plurality of objects may be simultaneously rotated by same rotation amount, in the same direction and at the same angle. The details of the operation will be illustrated in a flowchart of FIG. 10.

Figure 6A:
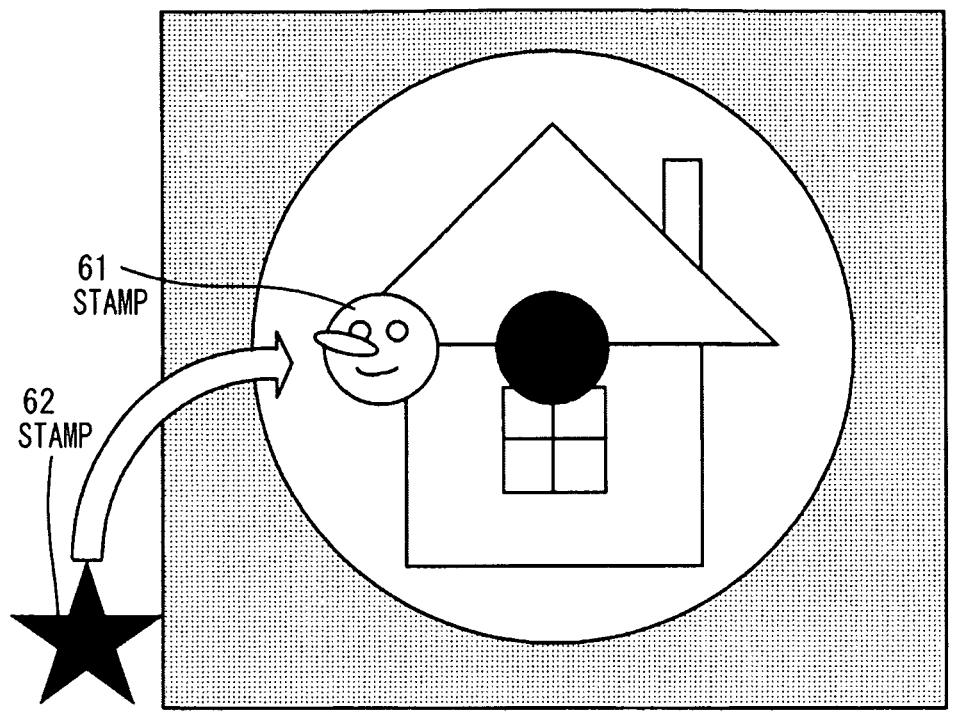
FIG. 6A illustrates an example of a case where, when a stamp is already present, another stamp is added.
Figure 6B:
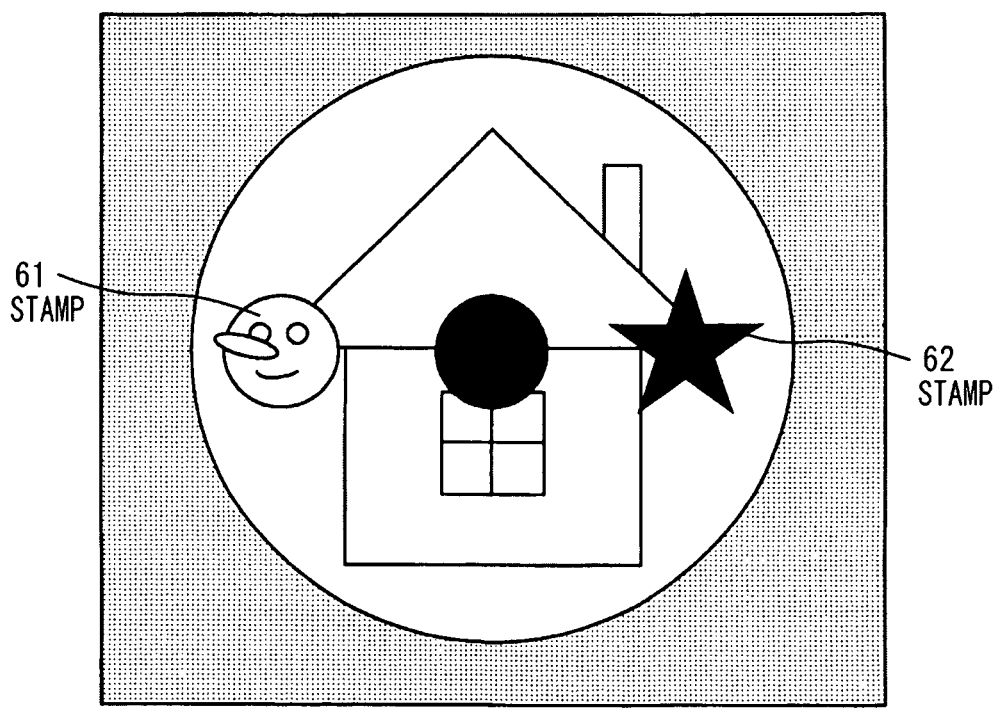
FIG. 6B illustrates an example where stamps are arranged diagonally.
Figure 6C:
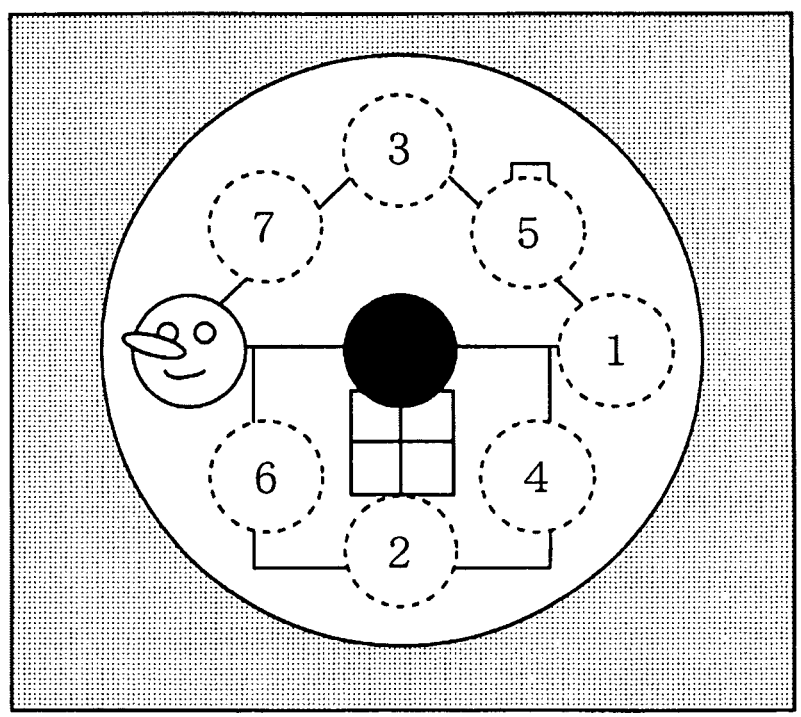
FIG. 6C illustrates an example of an order for arranging stamps in the exemplary embodiment of the present invention.

FIGS. 6A to 6C illustrate examples of a default position of the object during the preview of DVD/CD printing.

FIG. 6A illustrates an example of a case where a next stamp 62 is added to an image on which a stamp 61 is already present.

FIG. 6B illustrates an example where the stamp 62 is arranged diagonally across from the stamp 61.

Thus, in one version, if the default position for placing a stamp overlaps with an already placed object, a number and arrangement of stamps can be easily understood by arranging the stamp far away from the position of the already placed object.

Further, in the arrangement of FIG. 6B, the stamps 61 and 62 are arranged so that their radii are the same.

FIG. 6C illustrates an example of an order for arranging the stamps in the present exemplary embodiment.

In the example as shown, the stamps are arranged at locations in the order illustrated by numerals 1 to 7, when they are added. If a number of the stamps increases further, arrangement positions may be increased by further dividing the region.

While in the present exemplary embodiment, the example is illustrated in which the number of added stamps is seven, the number of added stamps may also be other than seven. Further, the stamps may be arranged at locations other than those illustrated in FIG. 6C.

According to the embodiment of the method illustrated in FIGS. 6A to 6C, the object can be added so that a number and positional relationship of the objects are easy to understand.

Figure 7A:
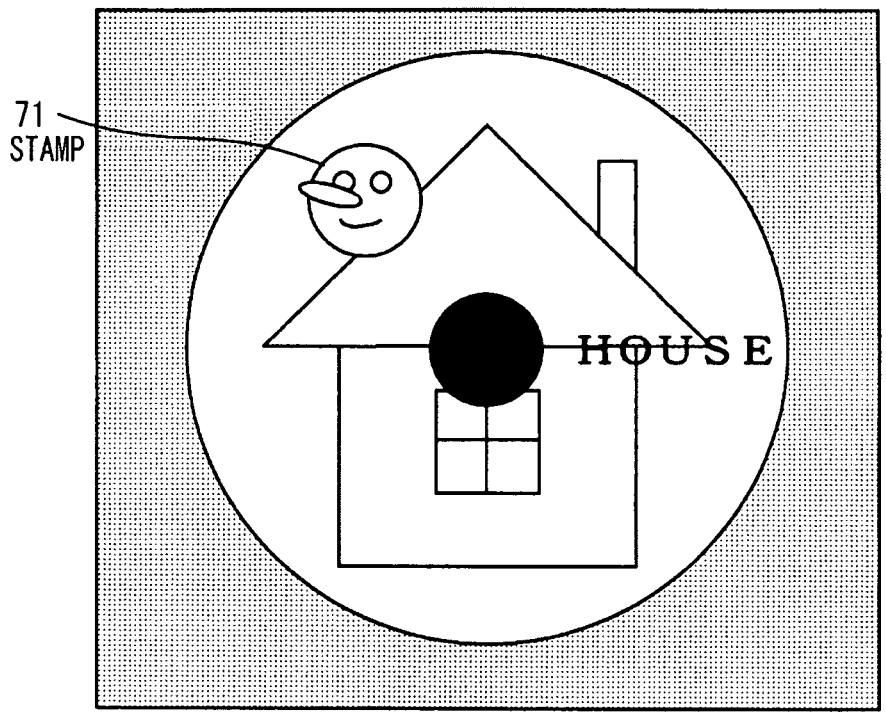
FIG. 7A illustrates an example of a stamp.
Figure 7B:
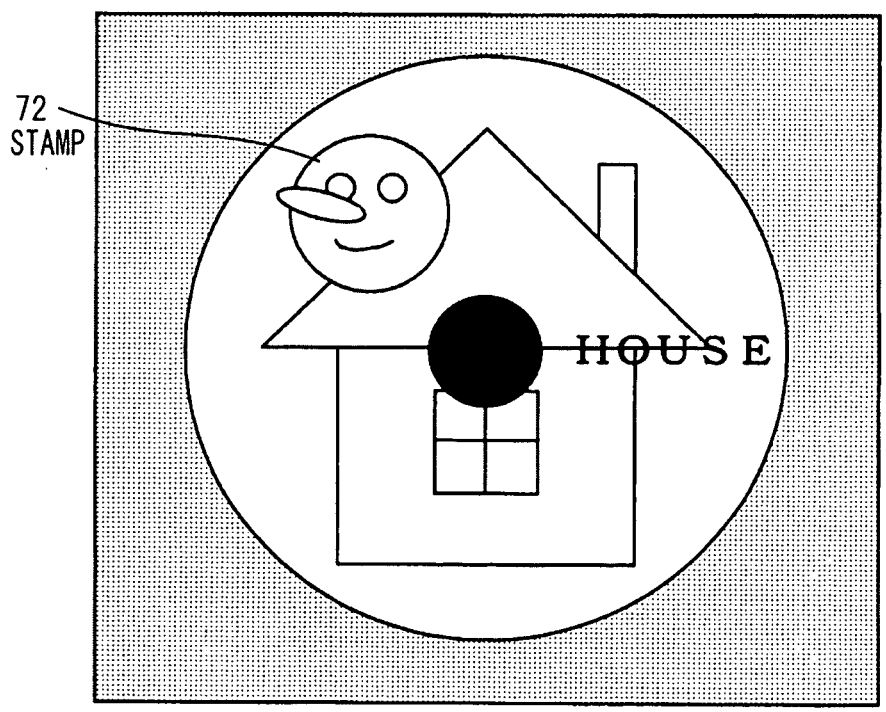
FIG. 7B illustrates an example in which the stamp illustrated in FIG. 7A is enlarged by a plus key.
Figure 7C:
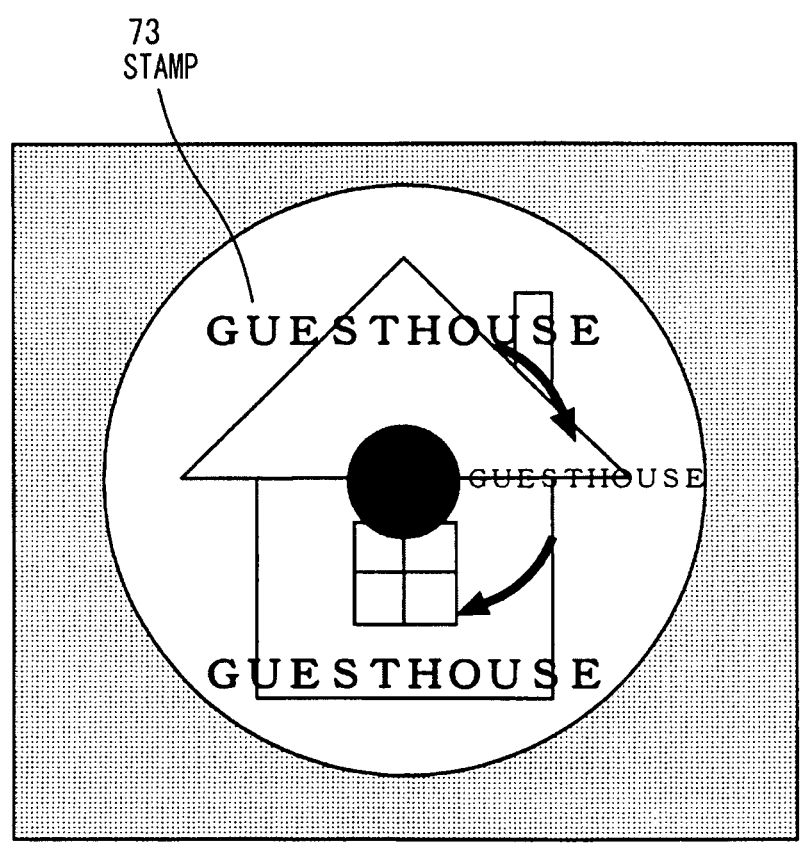
FIG. 7C illustrates examples of states where a stamp is enlarged/reduced.

FIGS. 7A to 7C illustrate examples of enlarging/reducing the object during the preview of DVD/CD printing.

FIG. 7A illustrates an example in which a stamp 71 is arranged on a preview image, which is displayed on the LCD 21.

In one version, the stamp 71 can be enlarged/reduced by the plus/minus keys 29 at the position where it is arranged. Operations of enlarging/reducing the stamp will be described below with a flowchart of FIG. 10.

FIG. 7B illustrates an example of a stamp 72, which corresponds to the stamp 71 illustrated in FIG. 7A as enlarged by the plus key. Reduction can be performed using the minus key by a similar method. Thus, using the plus/minus keys 29, enlargement/reduction can be performed.

FIG. 7C illustrates an example of enlargement/reduction states according to the position where a stamp 73 is arranged by rotational movement. As illustrated in FIG. 7C, when the stamp 73 is rotationally moved by the wheel device 26 around the center of the preview image, the stamp 73 is reduced if the stamp 73 protrudes from a width of a preview screen. Moreover, when the original-size stamp 73 is further moved to fit within the preview screen, enlargement may be performed, so that the stamp 73 is enlarged to its original size, for example. In other words, a variable magnification of the object may be changed so that the object fits within an area of the background image, according to the arrangement position of the object as a result of the object rotational movement. A size when the object is initially arranged may have a reduce factor of 1. Further, when re-enlarging the object after reduction as a result of the rotational movement, the magnification may be controlled so as not to exceed 1. When the object is text data rather than a stamp, to ensure that the object does not protrude from the preview screen, control may also be performed by changing a font size.

Figure 8:
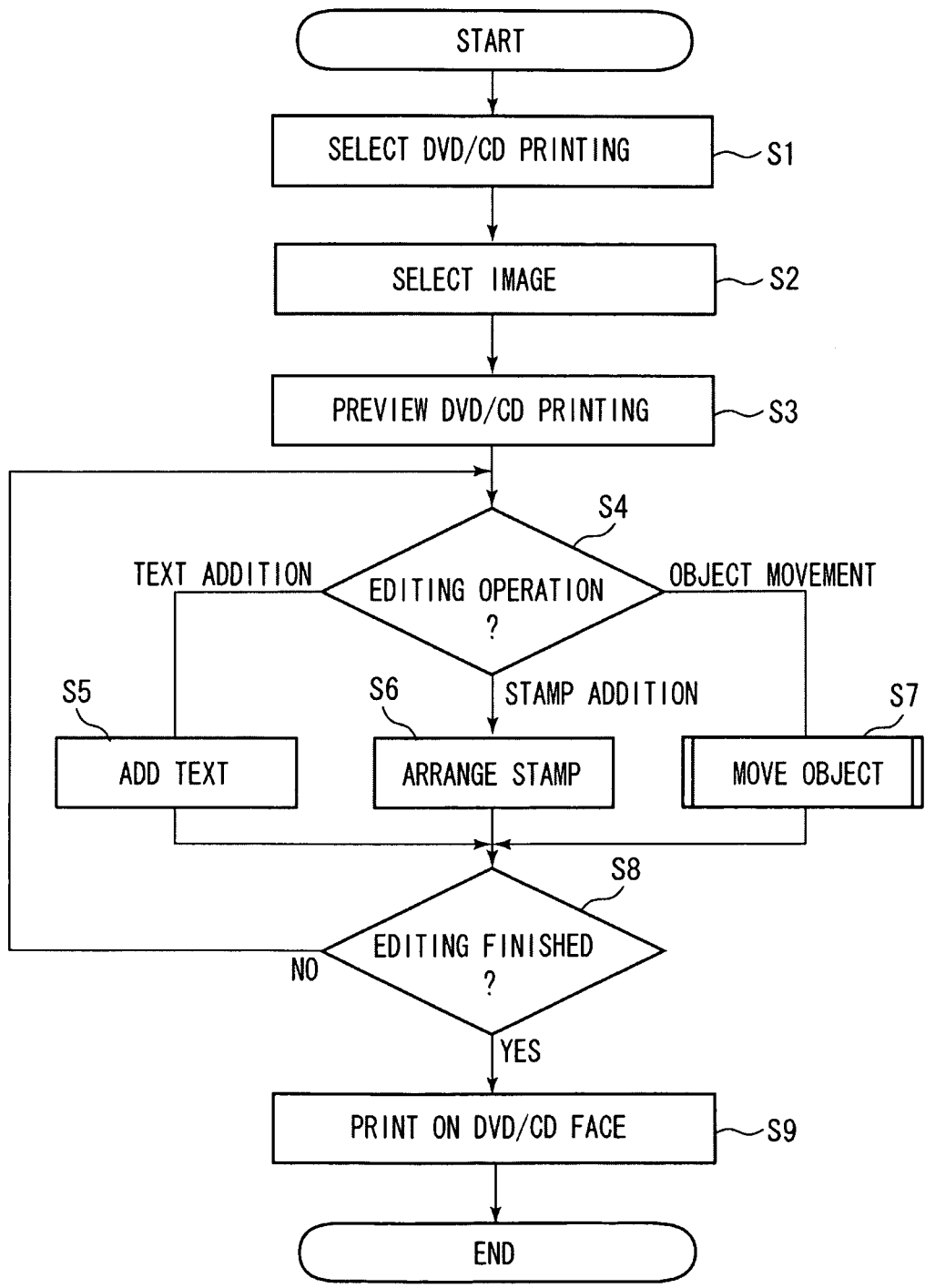
FIG. 8 is a flowchart illustrating an example of operations of printing a label onto a DVD/CD surface in the exemplary embodiment of the present invention.

FIG. 8 is a flowchart illustrating an example of operations of printing on the DVD/CD surface in the present exemplary embodiment.

In this embodiment, the recording unit 13 includes a DVD/CD printing mechanism. First, in step S1, a user selects DVD/CD printing via the operation unit 8. In step S2, the user selects the image to be printed on the DVD/CD. In step S3, the DVD/CD printing is previewed on the LCD 21. The background image may be, for example, selected by the user from the memory card MC1, or may be an image read by the reading unit 7.

Further, when the background image selected for printing onto the DVD/CD is displayed on the LCD 21, an image processing unit (not illustrated), may crop the background image into a circular shape around its center. Then, the cropped circular image is displayed on the LCD 21 as the preview image.

In step S4, the user selects an editing operation for the text data and stamp image to be combined with the background image via the operation unit 8. When text data addition is selected (TEXT ADDITION in step S4), processing proceeds to step S5, where the user adds the text data. Once the text data is added, the processing proceeds to step S8. Similarly, in step S4, when the user selects stamp addition via the operation unit 8 (STAMP ADDITION in step S4), processing proceeds to step S6, where the user adds a stamp. When the stamp is added in step S6, the added stamp may be arranged, for example, as illustrated in FIG. 6C. Once the stamp is added in step S6, the processing proceeds to step S8. When the user selects object movement in step S4 (OBJECT MOVEMENT in step S4), the processing proceeds to step S7. The object to be moved may be at least one of the stamp or the text data added in step S5 or step S6. In step S7, the object is moved based on the operation of the wheel device 26 by the user. The details of the object movement in step S7 are illustrated in FIG. 9.

Figure 9:
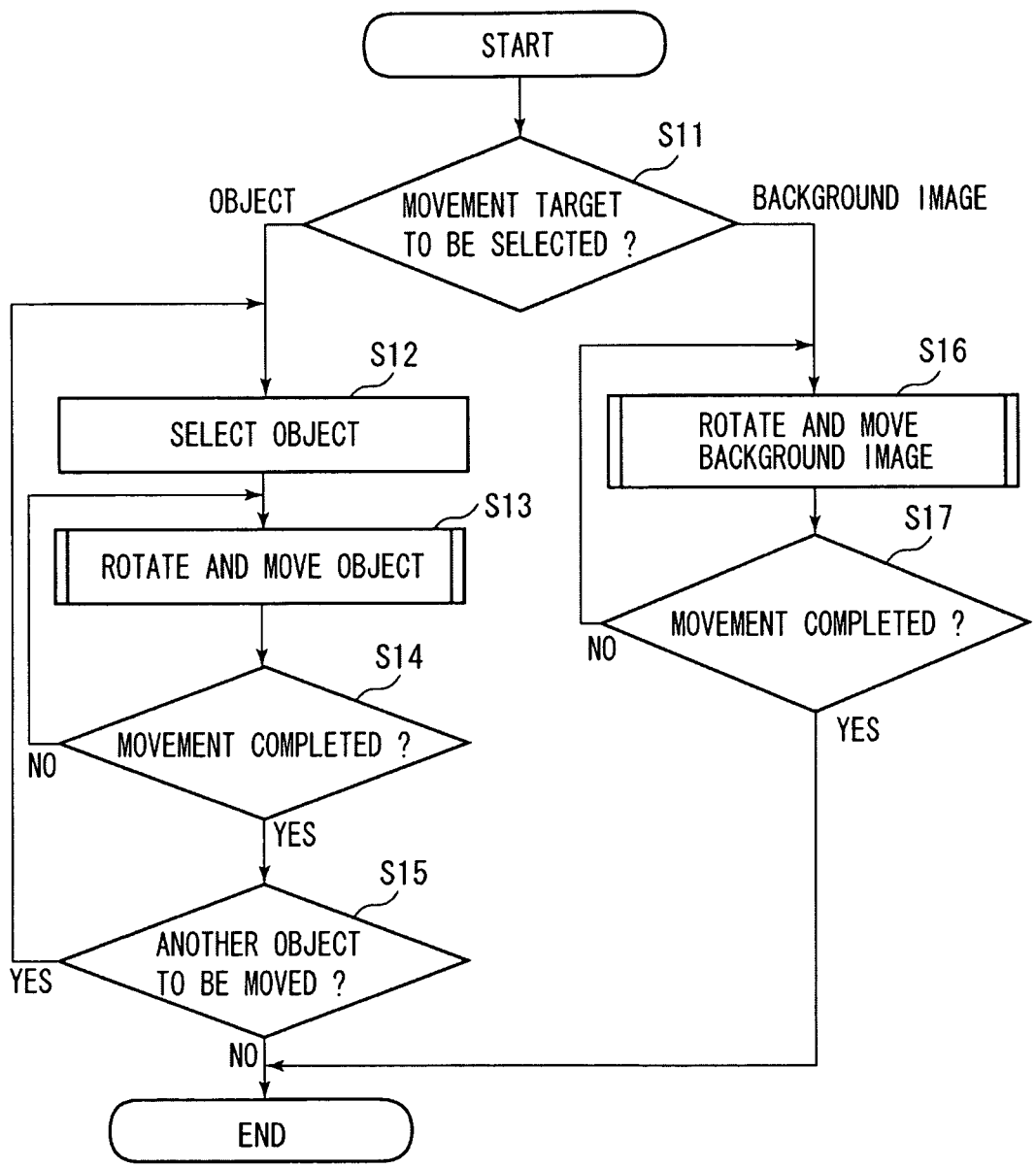
FIG. 9 is a flowchart illustrating an example of operations of rotating and moving the object and the background image during preview of an image to be printed on the DVD/CD in the exemplary embodiment of the present invention.

FIG. 9 is a flowchart illustrating an example of operations of arranging and moving the object and the background image by using the operation unit 8 (step S7), when previewing the background image and the object to be printed on the DVD/CD in the present exemplary embodiment. The operations of selection and others which are illustrated in the flowchart may all displayed on the LCD 21 as an operation screen, such as a selection operation, and operated by the user via the keys of the operation unit 8.

An outline of the object movement is illustrated in FIGS. 3A to 3C and FIGS. 4A to 4C. Returning to FIG. 8, in step S8, the CPU 1 determines whether the editing in the preview is finished. If the editing is not finished (NO in step S8), the processing returns to step S4. If the editing is finished (YES in step S8), the processing proceeds to step S9. In step S9, the recording unit 13 prints on the DVD/CD.

In step S11 in FIG. 9, the movement target is selected by the user via the operation unit 8. The movement target is either the background image 41 selected in step S2 or the object, such as the text data or stamp, which are added in step S5 or step S6. In FIG. 3A, the background image 41, the stamp 42, and the text 43 are the movement targets. In step S11, if the object is selected as the movement target (OBJECT in step S11), processing proceeds to step S12, where the object is selected. The object is selected by the operation of the up/down/right/left keys 28 or the wheel device 26. In selecting an object, one object or a plurality of objects may be selected.

The outline of the object movement and rotation is illustrated in FIGS. 3A to 3C and FIGS. 4A to 4C. In step S13, the user performs an object operation via the operation unit 8. After the object operation, in step S14, the user determines whether the movement is completed. If the movement is not completed (NO in step S14), the processing returns to step S13 and the user continues to perform movement and rotation of the object. If the movement is completed (YES in step S14), processing proceeds to step S15, where the user determines whether another object is to be moved. The operation in step S13 for moving and rotating the object will be described below using the flowchart of FIG. 10. If another object is to be moved (YES in step S15), the processing returns to step S12, and the user selects the object. If no other objects are to be moved (NO in step S15), the processing in the flowchart is finished.

If the background image was selected as the movement target in step S11 (BACKGROUND IMAGE in step S11), processing proceeds to step S16, where the user moves and rotates the background image via the operation unit 8.

Figure 13A:
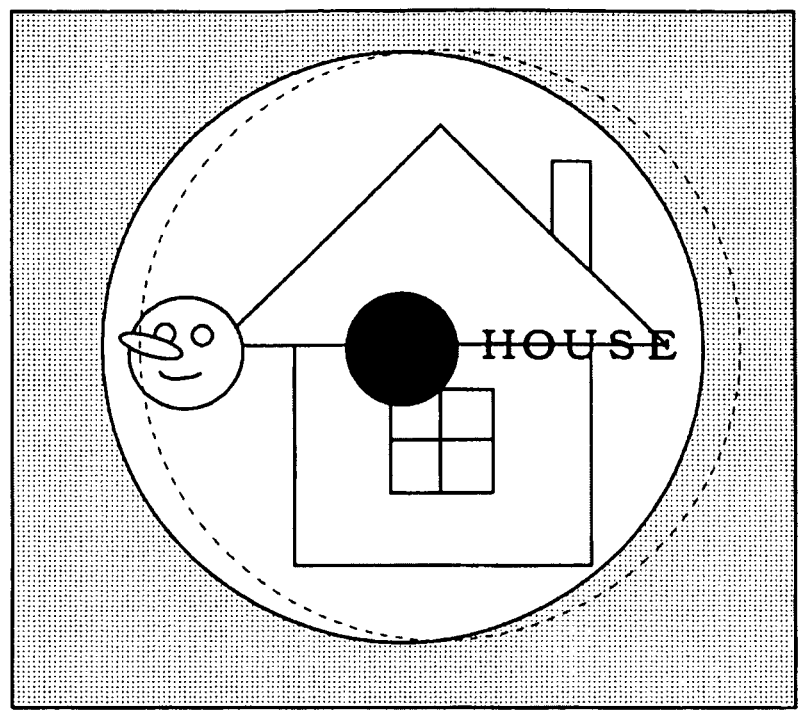
FIG. 13A illustrates an example of an action which moves the background image.

FIG. 13A illustrates an example of a case where the background image is moved.

The background image may be moved according to the operation of the up/down/right/left keys 28 on the preview display. As illustrated in FIG. 13A, by moving the background image, the position of the background image can be matched with the preview image.

Figure 13B:
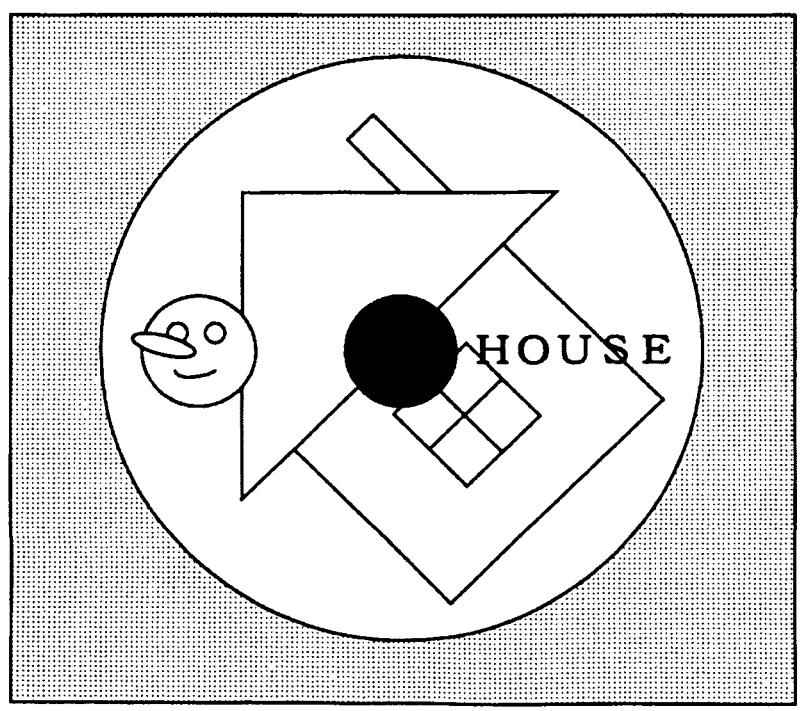
FIG. 13B illustrates an example of an action which rotates the background image.

FIG. 13B illustrates an example of a case where the background image is rotated.

The background image may be rotated along with the rotational operation of the wheel device 26. Although the operation illustrated in FIG. 13B is the same as the method illustrated in FIG. 3E, the method illustrated in FIG. 3E is cited as an example in which the stamp movement is complex. However, the example illustrated in FIG. 13B may nonetheless be effective for rotating only the background image. If the background image is selected as a target to be rotated in step S11 (BACKGROUND IMAGE in step S11), processing proceeds to step S16, where the background image may be rotated along with the rotation of the wheel device 26.

An example of the operations of moving and rotating the background image will be described below using the flowchart of FIG. 11.

In step S17, the user determines whether the movement is completed. If the movement is not completed (NO in step S17), the processing returns to step S16, and the movement and rotation of the background image are performed again. If the movement is completed (YES in step S17), the processing in the flowchart is finished.

FIGS. 13A and 13B illustrate an example of the outline of background image rotation.

As described above, in one embodiment, the object and the background image can be arranged and moved when the preview of DVD/CD printing is displayed on the LCD 21.

Figure 10:
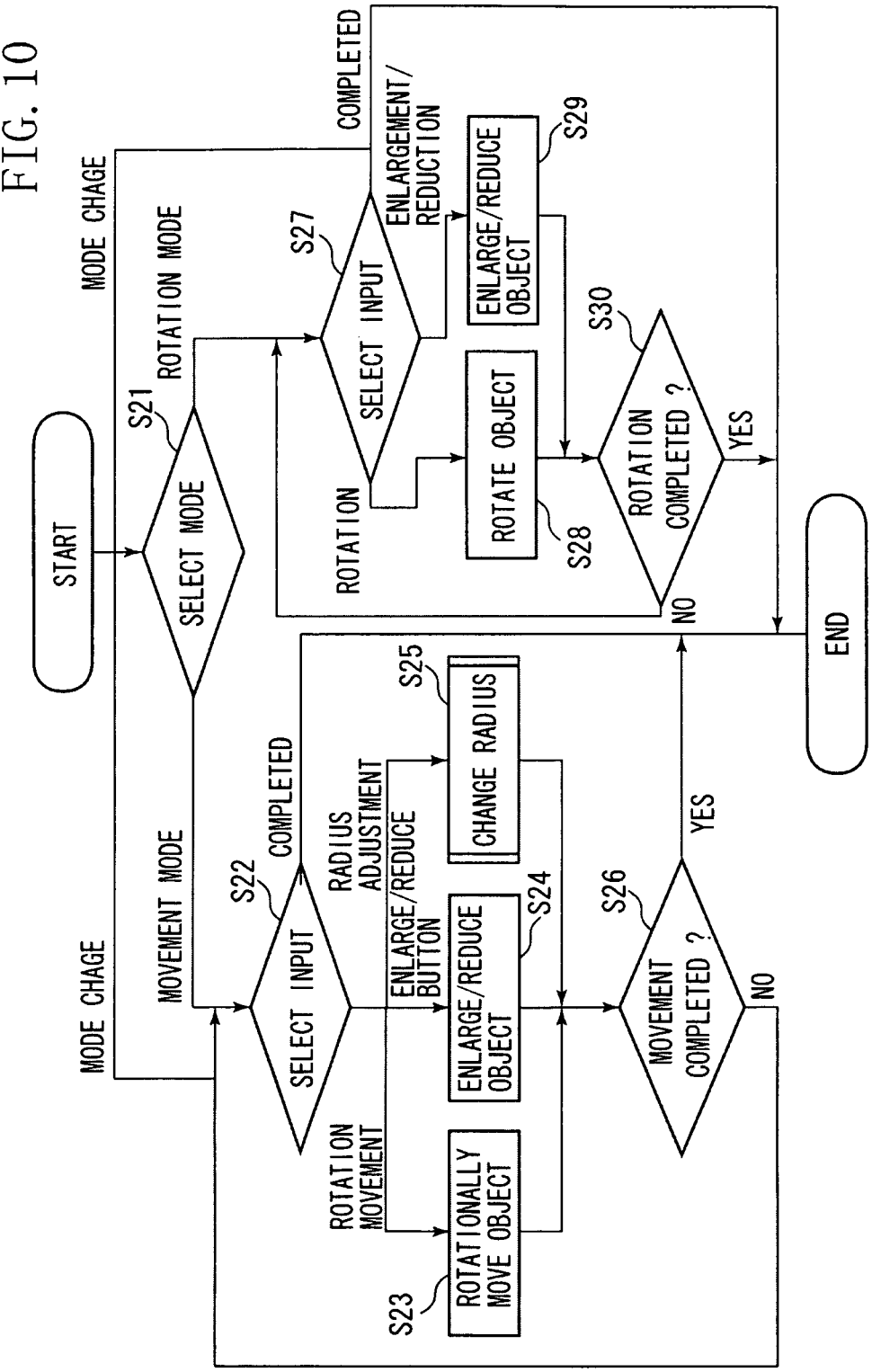
FIG. 10 is a flowchart illustrating an example of operations of moving and rotating the object in the exemplary embodiment of the present invention.

FIG. 10 is a flowchart illustrating an example of the operation for moving and rotating the object (step S13) with respect to the background image on the preview screen in the present exemplary embodiment.

The operation screens of the selection operations, etc., illustrated in the flowchart, may all be displayed on the LCD 21, and may allow the user to set a movement mode or a rotation mode by the keys of the operation unit 8.

In step S21, based on a user's mode setting by using the operation unit 8, the movement mode which moves the object, or the rotation mode which rotates the object, is selected. After the mode is selected via the operation unit 8, the movement or rotation corresponding to the respective mode can be appropriately executed by the user who operates the wheel device 26 or the up/down/right/left keys 28. In step S21, if the movement mode is selected via the operation unit 8 (MOVEMENT MODE in step S21), the mode is changed to move the object, and processing proceeds to step S22, where the next processing is selected. As input, the rotational movement by rotating the wheel device 26, the enlargement/reduction by pressing down the plus/minus keys 29, radius adjustment by pressing down the up/down/right/left keys 28, and confirming by determining with the OK key 27 can be selected.

First, in step S22, if the wheel device 26 is rotated, it is determined that the rotation movement is selected (ROTATION MOVEMENT in step S22). Then processing proceeds to step S23, where the object is rotationally moved along with the rotation of the wheel device 26. As illustrated in FIG. 3C, when the wheel device 26 is turned clockwise, the object may be moved (e.g., revolves) in the clockwise direction around the center of the preview display that is displayed on the LCD 21, while maintaining the orientation direction of the object without any change in the top/bottom direction. Furthermore, when the wheel device 26 is turned anticlockwise, the object may be moved (e.g., revolves) in the anticlockwise direction around the center of the preview display that is displayed on the LCD 21, while maintaining the direction of the object. If the plus/minus keys 29 are pressed down in step S22, it is determined that an enlarge/reduce operation is selected (ENLARGE/REDUCE BUTTON in step S22), processing proceeds to step S24, where the object is enlarged or reduced. An example of the outline of the enlargement/reduction of the object is illustrated in FIGS. 7A and 7B.

If the up/down/right/left keys 28 are pressed down in step S22, it is determined that a radius adjustment operation is selected (RADIUS ADJUSTMENT in step S22), and processing proceeds to step S25, where the radius is adjusted. The radius is the distance between the center of the preview display displayed on the LCD 21 and the center of the object. By adjusting the radius, the distance of the object from the center of the preview display displayed on the LCD 21 can be adjusted. An example of an outline thereof is illustrated in FIG. 4.

Once the processing of steps S23 to S25 is finished, in step S26, the user determines whether the movement of the object is completed. If the movement is not completed (NO in step S26), the processing returns to step S22 and the input is selected. If the movement is completed (YES in step S26), the processing in the flowchart is finished.

On the other hand, in step S21, if the rotation mode is selected (ROTATION MODE in step S21), processing proceeds to step S27, where the next processing is selected. In step S27, rotation, enlargement/reduction, or completion of the processing can be selected for further processing. If the rotation is entered by the wheel device 26, it is determined that the rotation is selected(ROTATION in step S27), and processing proceeds to step S28, where the selected object is rotated around its center. An outline of an example of object rotation is illustrated in FIGS. 5A and 5B. For example, when the wheel device 26 is rotated in the clockwise direction, the object may be rotated in the clockwise direction, and when the wheel device 26 is rotated in the anticlockwise direction, the object may be rotated in the anticlockwise direction.

As illustrated in the example of FIG. 5B, the plurality of objects can be rotated simultaneously in conjunction with the rotation of the wheel device 26. In step S12 of FIG. 9, if the plurality of objects is selected using the operation unit 8, the plurality of objects is simultaneously rotated. Further, if the plus/minus keys 29 are pressed down in step S27, it is determined that an enlarge/reduce operation is selected (ENLARGEMENT/REDUCTION in step S27), and processing proceeds to step S29, where the object is enlarged/reduced. An outline of an example of object enlargement/reduction is illustrated in FIGS. 7A and 7B. Once the processing of steps S28 and 29 is finished, in step S30, the user determines whether the rotation is completed. If the user operates the OK key, and once rotation is completed (YES in step S30), the processing in the flowchart is finished. Further, if rotation is not completed (NO in step S30), the processing returns to step S27, and the input is again selected.

As described above, the object to be combined may be rotated and moved.

Figure 11:
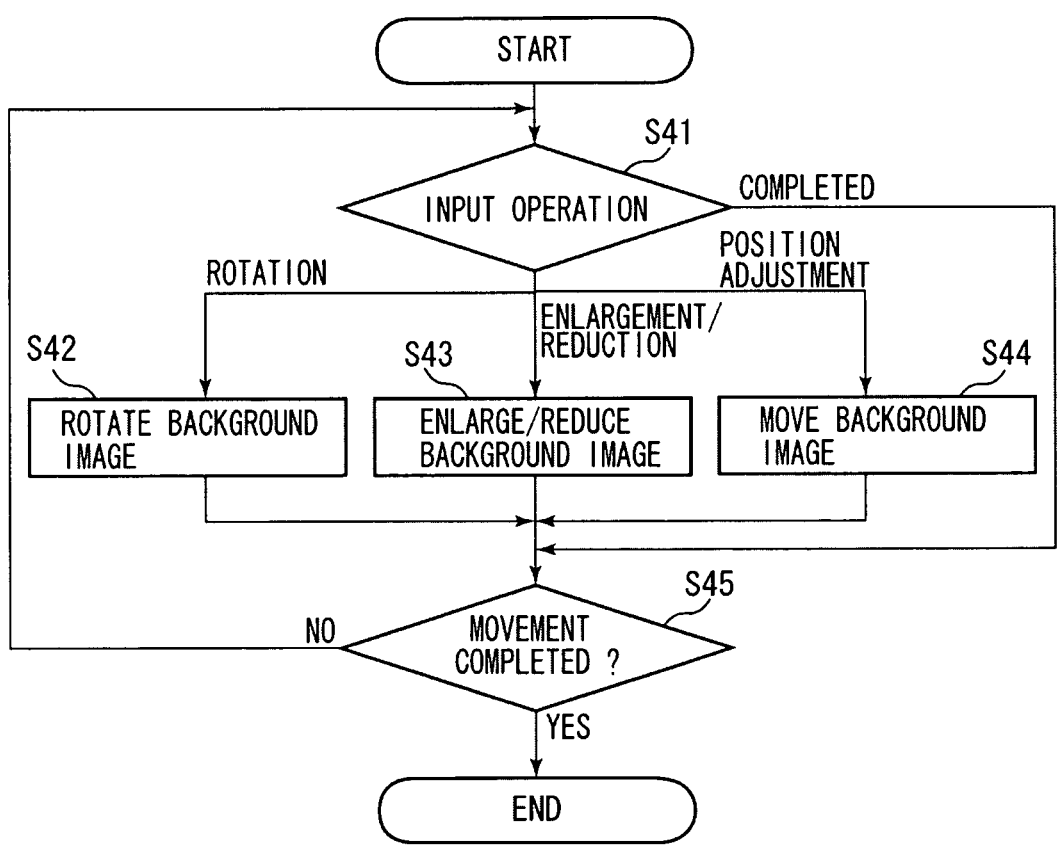
FIG. 11 is a flowchart illustrating an example of details of the operations of moving and rotating the background image.

FIG. 11 is a flowchart illustrating an example of the operations for moving and rotating the background image to be combined in the present exemplary embodiment.

The operation screens of the selection actions, etc., illustrated in the flowchart, are all displayed on the LCD 21 and can be operated by the user via the operation unit 8.

The operations illustrated in the example of FIG. 11 are for rotating the background image, and may be realized by the method illustrated in FIG. 3E. However, these operations are effective as the rotation operation of the background image, and here the method of FIG. 3E is described.

In step S41, an input operation is received via the operation unit 8. The input operations include the rotation, the enlargement/reduction, and the position adjustment. If a rotation operation is input via the wheel device 26 (ROTATION in step S41), processing proceeds to step S42, where based on the rotation of the wheel device 26, the background image is rotated. The outline of the background image rotation is illustrated in FIG. 3E.

When the wheel device 26 is turned in the clockwise direction, the background image is rotated clockwise. When the wheel device 26 is turned in the anticlockwise direction, the background image is rotated anticlockwise. If an enlarge/reduce operation is input in step S41 by operating the plus/minus keys 29 (ENLARGEMENT/REDUCTION in step S41), processing proceeds to step S43, where the background image is enlarged/reduced. If position adjustment is input in step S41 (POSITION ADJUSTMENT in step S41), processing proceeds to step S44, where the position of the background image is adjusted. Once the processing of steps S42 to S44 is finished, in step S45, the user determines whether the movement is completed. If movement operation is completed by pressing down of the OK key 27 (YES in step S45), the processing in the flowchart is finished. If the movement operation is not completed (NO in step S45), the processing returns to step S41, and the input operation is again accepted.

By processing in the above manner, the background image to be combined can be moved and rotated.

Figure 12:
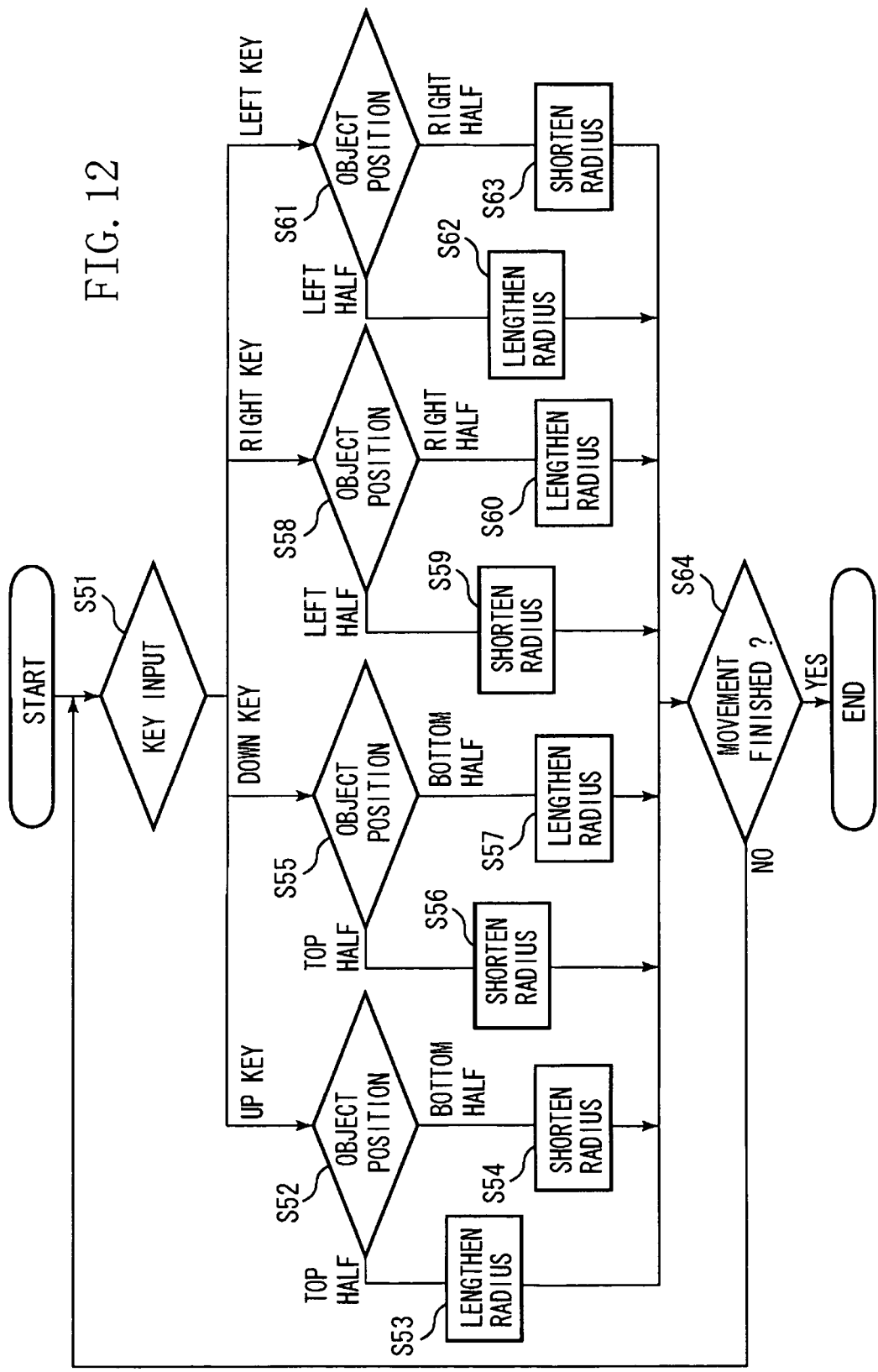
FIG. 12 is a flowchart illustrating an example of operations of adjusting radius length of the object to be combined in the present exemplary embodiment.

FIG. 12 is a flowchart illustrating an example of an operation of adjusting the radius length of the object to be combined (step S25) in the present exemplary embodiment.

The operation screens of the selection actions, etc., illustrated in the example of the flowchart are all displayed on the LCD 21 and can be selected and operated by the user via the operation unit 8.

FIG. 13A illustrates the example of the background image which is moved by the operation of the up/down/right/left keys 28.

FIG. 13B illustrates the example of the background image which is moved by the operation of the wheel device 26.

In step S51, the CPU 1 determines which key on the operation unit 8 is input. Among the up/down/right/left keys 28, when the up key is input (UP KEY in step S51), processing proceeds to step S52, where the CPU 1 determines where the object is located in a print preview display on the LCD 21. If the object position is in the top half of the preview display (TOP HALF in step S52), processing proceeds to step S53, where the CPU 1 lengthens the distance from the center of the preview display to the object (i.e. the radius). If it is determined in step S52 that the object is in the bottom half of the preview display (BOTTOM HALF in step S52), processing proceeds to step S54, where the CPU 1 shortens the radius, namely the distance from the center of the preview display to the object.

Among the up/down/right/left keys 28, if the down key is input (DOWN KEY in step S51), processing proceeds to step S55, where the CPU 1 determines where the object is located in the print preview display displayed on the LCD 21. If the object position is in the top half of the preview display (TOP HALF in step S55), processing proceeds to step S56, where the CPU 1 shortens the radius, namely the distance from the center of the preview display to the object. If it is determined in step S55 that the object is in the bottom half of the preview display (BOTTOM HALF in step S55), processing proceeds to step S57, where the CPU 1 lengthens the distance from the center of the preview display to the object (i.e., the radius).

Among the up/down/right/left keys 28, if the right key is input (RIGHT KEY in step S51), processing proceeds to step S58, where the CPU 1 determines where the object is located in the print preview display. If the object position is in the left half of the preview display (LEFT HALF in step S58), processing proceeds to step S59, where the CPU 1 shortens the distance from the center of the preview display to the object (i.e., the radius). If it is determined in step S58 that the object is in the right half of the preview display (RIGHT HALF in step S58), processing proceeds to step S60, where the CPU 1 lengthens the radius, namely the distance from the center of the preview display to the object.

Among the up/down/right/left keys 28, if the left key is input (LEFT KEY in step S51), processing proceeds to step S61, where the CPU 1 determines where the object is located in the print preview display. If the object position is in the left half of the preview display (LEFT HALF in step S61), processing proceeds to step S62, where the CPU 1 lengthens the radius, namely the distance from the center of the preview display to the object. If it was determined in step S61 that the object is in the right half of the preview display (RIGHT HALF in step S61), processing proceeds to step S63, where the CPU 1 shortens the radius, namely the distance from the center of the preview display to the object.

After the processing of steps S53, S54, S56, S57, S59, S60, S62, and S63, in step S64, the CPU 1 determines whether the movement is finished. If the movement is not finished (NO in step S64), the processing returns to step S51 and the user can again operate the up/down/right/left keys 28 and adjust the radius. If the movement is finished (YES in step S64), the processing is finished.

According to the above method, the radius length of the object to be combined can be adjusted.

According to the above exemplary embodiment, rotation around the center of the preview display can be directly executed while maintaining the orientation direction of the background image and the orientation direction of the image to be combined. Further, according to the above exemplary embodiment, rotating the image itself and moving (revolving) the position along the circumference without rotating the image, can be directly and independently operated.

Also, direct operation of enlargement/reduction of the object and lengthening/shortening of the radius during movement can be realized by determining based on the position, etc., of the image.

While a stamp, text data etc. are described as targets to be combined in the present exemplary embodiment, targets other than stamps or text data may also be used.

In the above description, an example was illustrated in which the object is moved while maintaining its orientation direction in a display screen. However, for example, the object may also be moved while changing its orientation direction on the display screen as in FIG. 3D or 3E, while the wheel device is being rotated, and the orientation direction may also be adjusted after the rotation of the wheel device has stopped.

In the present exemplary embodiment, while the rotation and rotational movement are performed using text data, objects (i.e., objects to be combined) other than text data may also be rotated and rotationally moved.

Further, in the present exemplary embodiment, as an example, the image is printed on a circular storage medium. However, so long as aspects according to the above described method for moving an object are employed, the invention is not limited to printing on the circular storage medium.

While the image processing apparatus of the above exemplary embodiment is capable of printing an image, the present invention is not limited thereto. For example, the aspects of the present invention may also be employed in a digital camera and a mobile telephone having a wheel device. In such a case, for example, an image which combines a background image and an object may be printed by transmitting the image to a printing apparatus.

Furthermore, aspects of the present invention may be applied to processing on apparatuses that do not have a wheel device or a display, such as a personal computer (PC). In this case, a PC performs processing based on, for example, instructions from a user input via a pointing device such as a mouse. The user can give instructions similar to the above-described wheel device by performing a drag operation to move an object displayed on a monitor over a circular image using the mouse.

Furthermore, in one embodiment a storage medium that contains computer executable instructions for realizing functions of the above exemplary embodiment may be supplied to a system or an apparatus such as a PC. In such a case, aspects of the present invention can be achieved by having a processing unit (or CPU or micro processing unit (MPU)) of that system or apparatus read and execute the computer-executable instructions of program code stored in the storage medium. In this case, the computer-executable instructions read from the storage medium may realize the functions of, for example, the above exemplary embodiment, so that the storage medium which stores the computer-executable instructions constitutes an embodiment of the present invention.

Examples of storage media for supplying the program code which may be used may include, but are not limited to, a floppy disk, a hard disk, an optical disk, a magneto-optical disk, CD-ROM, CD-recordable (CD-R), a magnetic tape, a non-volatile memory card, a ROM, a DVD and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-004907 filed Jan. 11, 2008, which is hereby incorporated by reference herein in its entirety.

What is claimed is:

1. An image processing apparatus comprising:
   an acquiring unit configured to acquire a background image and one or more objects;
   a display control unit configured to cause a display screen to display an image in which the one or more objects are combined on the background image;
   a moving control unit configured to move, according to a rotating instruction by a user, the one or more objects displayed by the display control unit relative to the background image, so as to keep a distance between a center of the background image and the one or more objects, and so as to keep, during the moving of the one or more objects relative to the background image, both of an orientation, with respect to the display screen and the background image, from top to bottom of the one or more objects and an orientation with respect to the display screen from top to bottom of the background image; and
   a determining unit configured to determine a layout of the background image and the at least one objects according to the moving by the moving control unit.

2. The image processing apparatus according to claim 1, further comprising:
   a cropping unit configured to crop an image into a circular region,
   wherein the acquiring unit is configured to acquire an image in which the circular region is cropped by the cropping unit as the background image.

3. The image processing apparatus according to claim 1, further comprising:
   a mounting unit configured to mount a storage medium; and
   a reading unit configured to read an image from the storage medium mounted on the mounting unit,
   wherein the acquiring unit acquires crops the image read by the reading unit.

4. The image processing apparatus according to claim 1, further comprising:

a size changing unit configured to change a size of the one or more objects displayed on the display screen according to the moving of the one or more objects in the background image by the moving control unit.

5. The image processing apparatus according to claim 4, wherein, when the one or more objects are an image corresponding to text data, the size changing unit changes a size of a font of the text data.

6. The image processing apparatus according to claim 1, wherein, in a case where the display control unit displays on the display screen an image in which a plurality of objects are combined on the background image, the moving control unit moves each object displayed on the display screen by the same movement amount in the same movement direction.

7. The image processing apparatus according to claim 1, further comprising:
a distance changing unit configured to change, according to an instruction by the user, the distance between the center of the background image and the one or more objects which are displayed on the display screen,
when the moving of the one or more objects by the moving control unit is not performed.

8. The image processing apparatus according to claim 1, further comprising:
a rotation control unit configured to rotate, according to a rotating instruction, the one or more objects displayed by the display control unit around the center of each of the one or more objects,
when the moving of the one or more objects by the moving control unit is not performed.

9. The image processing apparatus according to claim 1, further comprising:
a size changing unit configured to change, according to an instruction by a user, a size of each of the one or more objects displayed on the display screen.

10. An image processing method comprising:
acquiring a background image and one or more objects;
causing a display screen to display an image in which the one or more objects are combined on the background image;
according to a rotating instruction by a user, moving the one or more objects displayed on the display screen relative to the background image, so as to keep a distance between a center of the background image and the one or more objects, and so as to keep, during the moving of the one or more objects relative to the background image, both of an orientation, with respect to the display screen and the background image, from top to bottom of the one or more objects and an orientation with respect to the display screen from top to bottom of the background image; and
determining a layout of the background image and the at least one object according to the moving.

11. A non-transitory computer-readable storage medium containing computer-executable instructions for controlling an image processing apparatus, the computer-readable storage medium comprising:
computer-executable instructions for acquiring a background image and one or more objects;
computer-executable instructions for causing a display screen to display an image in which the one or more objects are combined on the background image;
computer-executable instructions for, according to a rotating instruction by a user, moving the one or more objects displayed relative to the background image, so as to keep a distance between a center of the background image and the one or more objects, and so as to keep, during the moving of the one or more objects relative to the background image, both of an orientation, with respect to the display screen and the background image, from top to bottom of the one or more objects and an orientation with respect to the display screen from top to bottom of the background image; and
computer-executable instructions for determining a layout of the background image and the at least one object according to the moving.

12. The image processing method according to claim 10, further comprising:
cropping an image into a circular region,
wherein an image is acquired in which the circular region is cropped as the background image.

13. The image processing method according to claim 10, further comprising:
mounting a storage medium; and
reading an image from the mounted storage medium,
wherein the image read from the mounted storage medium is acquired.

14. The image processing method according to claim 10, further comprising:
changing a size of the one or more objects displayed on the display screen according to the moving of the one or more objects in the background image.

15. The image processing method according to claim 14, wherein, when the one or more objects are an image corresponding to text data, a size of a font of the text data is changed.

16. The image processing method according to claim 10, wherein, in a case where an image is displayed on the display screen in which a plurality of objects are combined on the background image, each object displayed on the display screen is moved by the same movement amount in the same movement direction.

17. The image processing method according to claim 10, further comprising:
changing, according to an instruction by the user, the distance between the center of the background image and the one or more objects which are displayed on the display screen,
when the moving of the one or more objects is not performed.

18. The image processing method according to claim 10, further comprising:
rotating, according to a rotating instruction, the one or more displayed objects around the center of each of the one or more objects,
when the moving of the one or more objects is not performed.

19. The image processing method according to claim 10, further comprising:
changing, according to an instruction by a user, a size of each of the one or more objects displayed on the display screen.

* * * * *